(12) United States Patent
Kumar et al.

(10) Patent No.: US 11,301,684 B1
(45) Date of Patent: Apr. 12, 2022

(54) VISION-BASED EVENT DETECTION

(71) Applicant: Amazon Technologies, Inc., Seattle, WA (US)

(72) Inventors: Dilip Kumar, Seattle, WA (US); Liefeng Bo, Seattle, WA (US); Keunhong Park, Seattle, WA (US); Gerard Guy Medioni, Seattle, WA (US); Nikhil Chacko, Seattle, WA (US); Jayakrishnan Kumar Eledath, Kenmore, WA (US); Nishitkumar Ashokkumar Desai, Redmond, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 15/839,734

(22) Filed: Dec. 12, 2017

Related U.S. Application Data

(60) Provisional application No. 62/566,079, filed on Sep. 29, 2017.

(51) Int. Cl.
*G06K 9/00* (2006.01)
(52) U.S. Cl.
CPC ..... *G06K 9/00718* (2013.01); *G06K 9/00744* (2013.01); *G06K 2009/00738* (2013.01)

(58) Field of Classification Search
CPC .......... G06K 9/00718; G06K 9/00744; G06K 2009/00738; G06K 9/00335; G06K 9/00664; G06K 9/00765; G06K 9/6259
See application file for complete search history.

(56) References Cited

U.S. PATENT DOCUMENTS

| | | |
|---|---|---|
| 9,117,106 B2 | 8/2015 | Dedeoglu et al. |
| 9,235,928 B2 | 1/2016 | Medioni et al. |
| 9,473,747 B2 | 10/2016 | Kobres et al. |
| 9,779,774 B1* | 10/2017 | Kang ................... G06K 9/6218 |
| 9,830,516 B1* | 11/2017 | Biswas ............... G06K 9/00765 |
| 10,127,438 B1 | 11/2018 | Fisher et al. |
| 10,133,933 B1 | 11/2018 | Fisher et al. |
| 2013/0284806 A1 | 10/2013 | Margalit |
| 2016/0173540 A1* | 6/2016 | Linden ................ H04L 65/1083 705/26.8 |
| 2017/0124398 A1* | 5/2017 | Birkbeck ............. H04N 13/139 |
| 2018/0300583 A1* | 10/2018 | Peng .................. G06K 9/00677 |

* cited by examiner

*Primary Examiner* — Xin Jia
(74) *Attorney, Agent, or Firm* — Lee & Hayes, P.C.

(57) ABSTRACT

This disclosure describes systems and techniques for detecting certain activity in image data, such as frames of video data. For example, the systems and techniques may create and utilize an activity classifier for detecting and classifying certain human activity in video data of a facility. In some instances, the classifier may be trained to identify, from the video data, certain predefined activity such as a user picking an item from a shelf, a user returning an item to a shelf, a first user passing an item to a second user, or the like. In some instances, the techniques enable activity detection using only video data, rather than in addition to data acquired by other sensors.

20 Claims, 13 Drawing Sheets

VISION-BASED EVENT DETECTION

BACKGROUND

Retailers, wholesalers, and other product distributors typically maintain an inventory of various items that may be ordered, purchased, leased, borrowed, rented, viewed, and so forth, by clients or customers. For example, an e-commerce website may maintain inventory in a fulfillment center. When a customer orders an item, the item is picked from inventory, routed to a packing station, and packed and shipped to the customer. Likewise, physical stores maintain inventory in customer accessible areas, such as in a shopping area, and customers can pick items from inventory and take them to a cashier for purchase, rental, and so forth. Many physical stores also maintain inventory in a storage area, fulfillment center, or other facility that can be used to replenish inventory located in the shopping areas or to satisfy orders for items that are placed through other channels (e.g., e-commerce). Other examples of entities that maintain facilities holding inventory include libraries, museums, rental centers, and the like. In each instance, for an item to be moved from one location to another, the item is picked from its current location and transitioned to a new location, users may move about within the facility, and so forth. It is often desirable to generate information about events occurring in the facility.

BRIEF DESCRIPTION OF FIGURES

The detailed description is set forth with reference to the accompanying figures. In the figures, the left-most digit(s) of a reference number identifies the figure in which the reference number first appears. The use of the same reference numbers in different figures indicates similar or identical items or features.

RELATED APPLICATION

Figure 1:
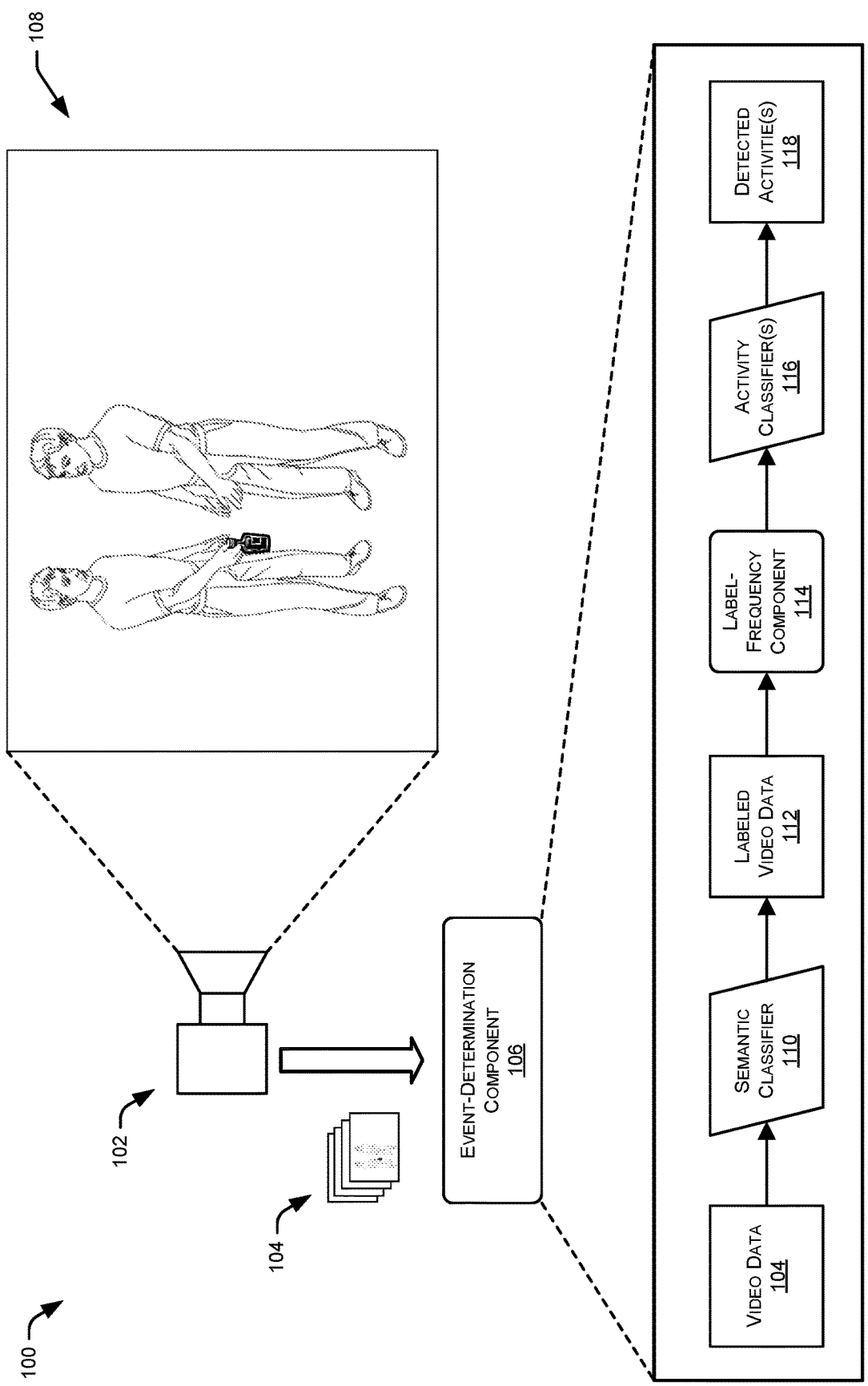
FIG. 1 illustrates an example scenario where an event-determination component is able to identify a predefined activity using video data. To do so, a camera sends the video data to the event-determination component, which associates semantic labels to the video data and provides the labeled data to one or more activity classifiers, each of which may be trained to identify a corresponding predefined activity.

This application is a continuation of U.S. Provisional Application No. 62/566,079, filed on Sep. 29, 2017 and entitled "Vision-Based Event Detection," the entirety of which is incorporated herein by this reference thereto.

DETAILED DESCRIPTION

This disclosure describes systems and techniques for detecting certain activity in image data, such as frames of video data. For example, the systems and techniques may create and utilize one or more activity classifiers for detecting and classifying certain human activity in video data of a facility, such as a brick-and-mortar retail store, a fulfillment center, an airport, a classroom, or any other location. In some instances, each activity classifier may be trained to identify, from the video data, certain predefined activity such as a user picking up an item, a user placing or setting down an item, a user inspecting a product, a first user passing an item to a second user, or the like. Of course, while the techniques are described below with reference to certain example activities, it is to be appreciated that the techniques may be used to create and utilize activity classifiers for identifying additional and/or different activities.

In some instances, each activity classifier may be trained to identify a corresponding predefined activity using only the image data, rather than the data acquired by other sensors in the facility. In other instances, the classifier may also utilize sensor data from other sensors, such as microphones, weight sensors, and the like. In each instance, a camera may acquire video data and send this data to an event-determination component that stores one or more activity classifiers for identifying the predefined activity. Upon receiving the video data, the event-determination component may input each frame of the video data into a semantic classifier that is configured to provide semantic labels to each pixel of each frame or to detect regions of interest within the frame. As used herein, a semantic label is used to indicate what the pixel data of the frame represents. For instance, example values of a semantic label may include "background", "shelf", "person", "item", and/or the like. Pixel data having a semantic-label value of "background" may indicate that the corresponding pixel data illustrates background, such as a wall, floor, or the like. Pixel data having a semantic-label value of "person" may indicate that the corresponding pixel data illustrates a user.

After the semantic classifier has provided values to the frames of the video data, the event-determination component may perform additional techniques for understanding the semantic view of the image data—that is, what each portion of each frame depicts. For instance, the event-determination component may define a grid of regions of each frame, with each region containing a certain number of pixels. For instance, a region may have a width, W, of pixels and a height, H, of pixels to create a region of W×H size (e.g., 10×10, 100×100, 500×500, etc.), with this size depending on any number of factors, such as computing power in the system, the size of the image data, and the like. The event-determination component may then determine, for each region, the frequency of each value of the semantic label. Using an example where the semantic classifier utilizes three values (e.g., background, user, item) and the event-determination component defines 10×10 pixel-size regions, the event-determination component may determine the frequency of each of the three values within the 100 pixels of this region. For instance, if this pixel region illustrates 20 pixels of background, 10 pixels of a user, and 70 pixels of an item, then the event-determination component may determine that the region represents 20% background, 10% user, and 70% item. In some instances, the event-determination component may normalize the values so that the total adds up to one (e.g., (0.20, 0.10, 0.70)). In another example, meanwhile, rather than normalize the values the event-determination component may indicate the percentages of the value, may indicate the raw numbers of labels within the pixel region, or the like.

Further, after determining the frequency of these values for a particular region, the event-determination component may define a spatiotemporal window around the particular region and may perform a similar analysis for this window. For instance, the event-determination component may analyze an N×N window of regions, such as a window of 3×3 regions, 10×10 regions or the like. Further, the event-determination component may, for the particular region of a particular frame, look at the same window in a number of prior frames and a number of frames that are after and adjacent to the particular frame. For instance, the techniques may analyze this spatiotemporal window for 15 frames prior to the particular frame and 15 frames after the particular frame. After defining this spatiotemporal window, the event-determination component may determine the frequency of each of the values of the semantic labels within this spatiotemporal window, and may use this frequency to determine one or more feature vectors to assign to the particular region of the particular frame. This feature vector(s) may thus represent the semantic view of this particular region. Further, the event-determination component may perform these techniques for each region within each frame. Furthermore, while the size of the spatiotemporal window may be the same across different pixel regions and different frames, in other instances the spatiotemporal window may adaptively change in size over different bins, frames, or the like. For example, if a pixel region has a high degree of label variability, the spatiotemporal window analyzed around this pixel may be relatively large, both in terms of the size of neighboring pixels and the number of prior and subsequent frames, as compared to the size of a spatiotemporal window for a pixel region that is relatively uniform (e.g., a pixel region that labeled as 100% "background").

After generating these feature vectors for these regions, the event-determination component may input this information into one or more activity classifiers that have each been trained to determine whether particular video data depicts a predefined activity based on the semantic information represented by these feature vectors. In some instances, each activity classifier has been trained to identify a particular activity, such as a user picking an item from a shelf, returning an item to the shelf, a first user passing an item to a second user, a user throwing an item (e.g., a ball) to another user, a user making a predefined gesture, a user running, and/or any other type of activity. In some instances, these feature vectors may be input into multiple classifiers, each of which may output an indication of whether the video data represents the particular activity, along with a start time of the activity, an end time of the activity, and a location of the activity. The start time may correspond to the timestamp of the frame at which the particular activity classifier identified the beginning of the activity (e.g., when the user begins reaching into the shelf), while the end time may correspond to the timestamp of the frame at which the particular activity classifier has identified the end of the activity (e.g., when the user pulls the item out of the shelf). The location information, meanwhile, may represent the path of the activity through the multiple frames between the start time and the end time. That is, the location may indicate respective regions of the respective frames corresponding to the activity that represent the particular activity. In the example of a user picking an item, for instance, the location may corresponding to the regions of the frames showing the user's hand, which reaches into the shelf and ultimately removes an item from the shelf.

In some instances, each actively classifier may generate one or more score maps that may be used to determine whether the image data represents the predefined activity that the respective classifier is configured to identity. Each score map may correspond to a frame and may indicate, in some instances, an indication of whether each pixel region of the corresponding frame represents the corresponding activity. In some instances, the activity classifier assigns each pixel region a score indicating the likelihood that the corresponding pixel region depicts the activity. This score may, in some instances, be applied to a threshold such that the score map indicates, in a binary fashion, whether each pixel region of the frame depicts the activity.

These score maps may be analyzed to determine whether the image data, over a series of frames, indicates the predefined activity. In some instances, the activity classifier or another component makes this determination by comparing the amount of pixel regions that indicate the activity and comparing this to a threshold. In some instances, the classifier or other component may deem image data to represent an activity if a certain number of score maps (corresponding frames of the image data) depict the activity consecutively. Stated otherwise, the classifier or the other component may determine whether a certain length of the video data, in time, is associated with score maps that each indicate the activity. In some instances, the classifier or other component may also use the amount of activity indicated in each of the score maps in determining whether the video data depicts the activity. For instance, the classifier or component may use the number of pixel regions in each of the score maps in determining whether the video data depicts the activity.

For example, in some instances the classifier or other component may indicate that video data depicts a particular activity if each score map for one second worth of frames contains at least one pixel group (or another threshold of pixel groups) that is associated with an indication that it depicts the activity. In other instances, meanwhile, the activity classifier or other component may utilize a function that takes into account the amount of pixel groups within each score map that indicate activity, the length (e.g., in time) of the score maps that indicate the activity, and the like in determining whether the score maps, and hence the video data, depict the predefined activity. It is to be appreciated that these functions and thresholds may be based on the activities being measured, the desired degree of accuracy, and the like.

Regardless of the thresholds and/or functions used, in some instances the activity classifier or the other component may output, after analyzing the score maps, an indication of a start time of the activity, an end time of the activity, and a location of the activity. The start time and the end time may each be expressed as a raw time, as a frame (which is in turn associated with a time), or in any other manner. The location, meanwhile, may be expressed as a path that changes over the frames between the start time and the end time, as a single location that bounds the location of any activity identified between the start and end time, or in any other manner.

In each instance, the indication of the activity and the start and end time of the identified activity may be provided to one or more additional components that uses this information along with additional information gathered by one or more sensors in the facility to take some action. For example, this information may be combined with information from a locating service that locates users through the facility to determine the identity of the user(s) involved, the item(s) involved, and the like. For instance, envision that the activity classifier outputs an indication that an activity of one user exchanging an item with another user has been detected at a particular location and time range in the facility. This information may be provided to a component that also determines, from the locating service, the identity of the two users at the specified location at the specified time. The component may also receive, from another service, an indication of the contents of the virtual carts associated with one or more of these identified users. With this information, the component may determine an action that occurred, such as a first identified user handing an identified item to a second identified user. The component, or another downstream component, may then remove an identifier of the identified item from the virtual-cart data associated with the first user and add the identifier of the item to the virtual-cart data of the second user. Of course, while one example is discussed, it is to be appreciated that the activity data output by the activity classifier may be combined within any other type of information to make a determination about an event has occurred within the facility for the purpose of taking any other action in addition to or in the alternative from adding or removing item identifiers from the virtual-cart data of the users.

Further, given that the feature vectors may be input into multiple activity classifiers, in some instances video data may be determined to represent multiple different activities. That is, the video data may be determined to represent each activity for which the respective activity classifier identified the corresponding activity with a confidence that is greater than a threshold. In other instances, the confidence scores may be compared and the event-determination component may determine that the activity having the highest confidence may be associated with the video data, while lesser-scoring activities are not associated with the video data.

Based on the above, the techniques described herein allow for the identifying of activity within a facility using image data and without reference to data acquired by other sensors in the facility. For instance, the techniques may utilize trained activity classifiers to identify predefined activities of interest from video data that has been semantically labeled.

Creating and training such an activity classifier may begin by creating a semantic classifier that is able to semantically label large amounts of video data, after which this semantically labeled video data may be manually labeled with activity labels. This video data may then be divided into groups corresponding to each predefined activity of interest, after which this video data—which is both semantically labeled and labeled with the particular activity of interest— is used to train a corresponding activity classifier. For instance, video data that has been both semantically labeled and manually labeled with an activity of "item pick" may be used to train an activity classifier for identifying users picking items from shelves.

To begin this training process, frames of video data may be manually labeled with both activity labels and semantic labels. For instance, human users may use user interfaces (UIs) (e.g., graphical user interfaces (GUIs)) to indicate which frames of video data depict which predefined user actions, such as an illustrated user picking an item from a shelf, or the like. In some instances, the human users may draw polygon or other shape around a portion of the frame(s) that corresponds to the activity. For instance, if an image frame illustrates a first user picking an item from a shelf, the human user may select which portion (e.g., in terms of x, y pixel coordinates) corresponds to the activity. For example, the human user may use computer-graphic tools to draw a rectangle around the user's hand, the item, and a portion of the shelf from which the item is being picked. The (x, y) pixel values within that rectangle may then be associated with the selected activity (or "action"), such as a user picking an item from a shelf. In addition, the remaining (x, y) pixel values may be associated with another activity label, which may include "no activity" in the instance where the remainder of the image frame was not indicated by the human user as being associated with another of the predefined activities (e.g., item pick, item return, etc.).

In some instances, a human user may indicate, by marking of the video data, when a predefined activity begins, when the activity ends, and the location of the activity therebetween. For example, a human user may indicate a beginning frame of video data at which an illustrated user begins reaching for an item from a shelf, an ending framed when the user places the item in a tote of the user, and a location of the event across this time period.

In addition, this same video data may be associated with semantic labels indicating the presence of certain predefined objects within the video data. For example, a human user may again manually label frames of the video data with the semantic labels to identify, for example, the portion of the frames corresponding a user, specific parts of the user, items, shelves, a background or the like. In one example, image frames of video data are marked to indicate respective locations of a user's head, a user's body, a user's arm (e.g., forearm), a user's hand, an item, an item in the user's hand, background, and/or the like. As described above with reference to activity labeling, in some instances video data may be semantically labeled based on human users drawing polygons or other shapes around the different portions of the images corresponding to the different semantic labels. Again, each pixel value of a particular frame may thus be associated with a particular semantic label (along with an activity label as described above).

After a certain amount of frames of video data has been manually labeled with the afore-mentioned semantic labels, a semantic classifier may be trained for labeling additional video data. For example, a fully convolutional network (FCN) or other type of classifier may be trained to semantically label the additional video data. In some particular instances, the techniques utilize an encoder/decoder scheme where RGB or RGB-D images are encoded into low-level features and a decoder network decodes them into an output, such as semantic labels. Further, given the ground-truth segmentations, the FCN or other classifier may be updated iteratively using stochastic gradient descent, which may minimize an error function that penalizes the model from predicted values that differ from ground truth.

After such a semantic classifier is trained, the semantic classifier may be improved as additional data is collective. For instance, a human user may provide periodic or continuous feedback to the model to correct errors, with these errors and corrections being propagated back through the classifier to fine-tune the parameters of the semantic classifier. After training, the semantic classifier may be configured to receive video data and determine a grid of probabilities indicating a probability that each pixel of a frame or over multiple frames depicts a respective semantic-label value (e.g., head, background, etc.). Given that subsequent operations of the techniques may utilize one defined semantic-label value per pixel (over one or more multiple frames of the video data), this probability grid may be converted into a discrete segmentation mask. The output of the FCN may thus be post-processed with a Dense Conditional Random Field (CRF) to ensure that neighboring pixels over one or more frames with similar RGB/RGB-D values are similar. The grid may be densely connected with an edge for each pair of neighboring pixels. A binary potential may thus result in spatiotemporal consistency, while a unary potential may help ensure that the output is faithful to input probability map.

After pixels have been associated with respective semantic labels (or respective "semantic-label values"), such that the system has a better semantic view of the corresponding video data, regions of the video data may be summarized by computing a histogram of the semantic labels for pixel groups (over one or more image frames). For example, a pixel-group size may first be selected, such as a block of pixel values that is ten pixels in length by ten pixels in width. Of course, while one example is described it is to be appreciated that any other size of pixel groups may be utilized. For a given pixel-group size, a number of occurrences of each semantic label may be determined. In the example of a 10×10 pixel group, the techniques may determine a number of the pixel values corresponding to each respective semantic label. For example, if the pixel group only displays background then the histogram for that particular pixel value may indicate that 100 pixel values (and, thus, 100% in this example) of the pixel group corresponds to background of the image.

Further, frames previous and/or subsequent to may be analyzed before assigning a final semantic value to each pixel value of the pixel group for a subject frame. That is, the same 10×10 block of pixel values may be analyzed in, for example, fifteen frames prior to a particular frame and fifteen frames subsequent to the particular frame. A histogram(s) for each of these frames may indicate an occurrence of each semantic label in each frame and, thus, the occurrence of each semantic label over the thirty-one frames of the video data. This information may thus be used to assign a final semantic label to each pixel of each pixel group.

After various videos have been labeled with both activity labels and semantic labels, this labeled video data may be used a train an activity classifier for identifying activity in subsequent video data. For instance, the trained classifier may detect activity within the subsequent video data, along with a start time and end time of the activity. For instance, after such an activity classifier has been trained using the labeled video data described above, the activity classifier may function to detect, from subsequent video data, a certain predefined activity, such as a user picking an item from a shelf, returning an item to a shelf, or the like. As noted above, in some instances multiple activity classifiers may be trained, each configured to identify a certain activity from semantically-labeled video data.

In some instances, the techniques described herein train a Support Vector Machine (SVM) using the training data described above, with the SVM functioning to compute the maximum-margin hyperplane between positive and negative examples of each predefined activity. In these instances, a positive example of a particular activity label corresponds to any semantic histogram feature that was computed for temporal window around a particular pixel that has been labeled with the particular activity label, while a negative example is the complement of all positive examples.

Given the above, it is to be appreciated that the negative examples of a particular activity label in the training data may vastly outweigh the number of positive examples. Therefore, rather than simply inputting all training data, the techniques may utilize a sampling scheme to train an initial activity classifier. For example, the techniques may randomly augment the training data by performing random cropping, rotations, and/or resizing of the positive examples to synthetically increase the number of positive examples. The sampled training data and the synthetically generated training data may then be input as training data for training the classifier. In some instances, an SVM may be trained using stochastic gradient descent which iteratively updates the parameters of the model.

In some instances this initially trained model may yield false positives, given that the negative training examples are not exhaustive. In order to suppress these false negatives and increase accuracy of the model, hard negative mining may be performed with the initial activity classifier. That is, false positives generated by the classifier may be analyzed to determine the semantic labels associated with the image data input into the classifier. After correcting a false positive, the activity classifier may then be trained based on this image data to lessen the probability that this problematic labeled data will later result in another false positive. In sum, hard negative mining and the artificial increase of positive examples results in an activity classifier that more accurately identifies negative and positive examples of the predefined activity. Further, the top-n number of negative examples in order of descending confidence may be added to a list of hard negative training examples. The activity classifier may then be retrained based on this list of negative examples, and the process may be repeated several times to continue to increase the accuracy of the activity classifier.

After a particular activity classifier has been trained, the activity classifier may be used to detect certain activity from subsequent video data. For instance, subsequent video data may be input into a semantic classifier for assigning semantic-label values (e.g., in the form of feature vectors) to the video data. These feature vectors may then be input to the particular activity classifier, which may output a score map of negative and positive examples for the activity for which the activity classifier has been trained to identify. That is, each pixel value over one or more frames may be assigned a score and the score then be applied to threshold to determine whether it is a positive example of a given activity (in instances where the score is above the threshold) or a negative example of the given activity (in instances where the score is below the threshold). Thus, the start time, end time, and location of a particular activity within the video data may be determined and stored for each of multiple different activity labels, as described above.

While the above systems and techniques describe creating an activity classifier for identifying predefined activity labels utilizing video data from a single camera, in some instances multiple cameras may be utilized for creating and/or using such as an activity classifier. For example, in some instances the system and techniques may train an activity classifier using video data from multiple synchronized cameras. In this example, a first camera and a second camera (potentially along with additional camera(s)) may at least partly overlap in their fields-of-view and, thus, may be calibrated with one another. Corresponding video data from these two calibrated cameras may then be used to train an activity classifier, which may increase the accuracy of the classifier.

In addition or in the alternative, multiple cameras may be utilized to identify predefined activity using a trained activity classifier. For example, first video data from a first camera may be provided to the activity classifier along with second video data from a second camera, where the first and second cameras are calibrated with one another and the first and second video data corresponds temporally with one another. The activity classifier may thus independently analyze the first and second video data to identify activity from the video data, and rules may be utilized for determining when to indicate that a particular activity has been detected. For instance, the techniques may utilize a rule indicating that an activity is deemed to have occurred if the classifier identifies the activity from any of the video feeds. In other instances, the techniques may create a weighted average of the confidence maps and compare the weighted average to a threshold to determine whether or not to deem an activity as detected. In still another example, a number of cameras that detected an activity (via the classifier) may be compared with the number that did not, with the positive votes weighed against the negative votes to determine whether an activity is to be deemed as having occurred. Of course, while a few examples have been provided, it is to be appreciated that the multiple cameras may be used to train and/or utilize the activity classifier in other ways.

Certain implementations and embodiments of the disclosure will now be described more fully below with reference to the accompanying figures, in which various aspects are shown. However, the various aspects may be implemented in many different forms and should not be construed as limited to the implementations set forth herein. The disclosure encompasses variations of the embodiments, as described herein. Like numbers refer to like elements throughout.

FIG. 1, for instance, illustrates an example scenario 100 where a camera 102 captures video data 104 and provides this video data 104 to an event-determination component 106 that is able to identify one or more predefined activities using the video data 104. As illustrated, the event-determination component 106 may receive and store the video data 104 before providing this video data 108 as input into a semantic classifier 110. As described above, the semantic classifier may comprise an FCN or other type of classifier that is configured to provide one of a number, n, different values of a semantic label to each pixel of each frame of the video data 104, such as to each pixel of example frame 208. For instance, the semantic classifier 110 may be configured to associate, to each pixel, a value of "background", "head", "arm", "item", "shelf", "ball", "display", "hat", "desk", "cat" and/or any other type of label value. As described above, the semantic classifier 110 may have been trained to identify these values using video data that was manually labeled with these values by human users.

The semantic classifier 110 may output the video data as labeled video data 112, representing that the video data provided by the camera has now been labeled on a per-pixel or per-pixel-group basis. This labeled video data 112 (or the values represented thereby) may be input to a label-frequency component 114 of the event-determination component 106. The label-frequency component 114 may be configured to analyze the data 114 to assign feature vectors to one more regions of each frame of the video data. For instance, as described above the label-frequency component 114 may define a series of pixel groups or regions within each frame and may determine the frequency of each label value within each pixel group. Thereafter, the label-frequency component may compute a spatiotemporal window around the pixel group and may use the values of the pixels in this window as input to determine final semantic-label values to assign to the particular pixel group. An example of using a spatiotemporal window in this manner is described in further detail below with reference to FIG. 3. In some instances, after analyzing the semantic-label values for pixel groups and/or spatiotemporal windows around the pixel groups the label-frequency component may compute one or more vectors and provide these feature vectors into one or more activity classifiers 116.

As noted above, each activity classifier 116 may be configured to identify, using the input feature vectors representing the semantic view of the video data, whether the video data 104 captured by the camera 102 in fact represents the corresponding activity. Again, the activity classifier 116 may be configured to assign a confidence value to each pixel of each frame of the video data, with the confidence value indicating whether or not the corresponding pixel represents the particular activity. If the confidence value is greater than a threshold, then the label-frequency component 114 may indicate that the pixel does in fact represent the activity, while determining that the pixel does not represent the activity if the score is less than the threshold. The activity classifier 116 may then determine, for each frame, whether a sufficient (e.g., threshold) number of pixels within the frame that are adjacent or near one another have been determined to represent the activity, and whether a sufficient (e.g., threshold) number of frames that are adjacent or near one another have such a number of pixels representing the activity. If so, then the activity classifier 116 may output an indication of a detected activity 118. This output may indicate that the activity was detected, along with a start time of the activity, an end time of the activity, and a location of the activity within the video data and/or within the facility itself. In some instances, the location of the camera 102 within the facility may be calibrated with known locations (e.g., shelves, item locations, etc.), such that the activity location output by the activity classifier 116 may indicate, or be used to determine, the location of the corresponding activity in the physical space of the store. In the illustrated example, for instance, the activity classifier 116 may output an indication that it has detected the activity of an item being passed from a first user to a second user, as well as the start and end times of the pass and the location of the activity.

Figure 2:
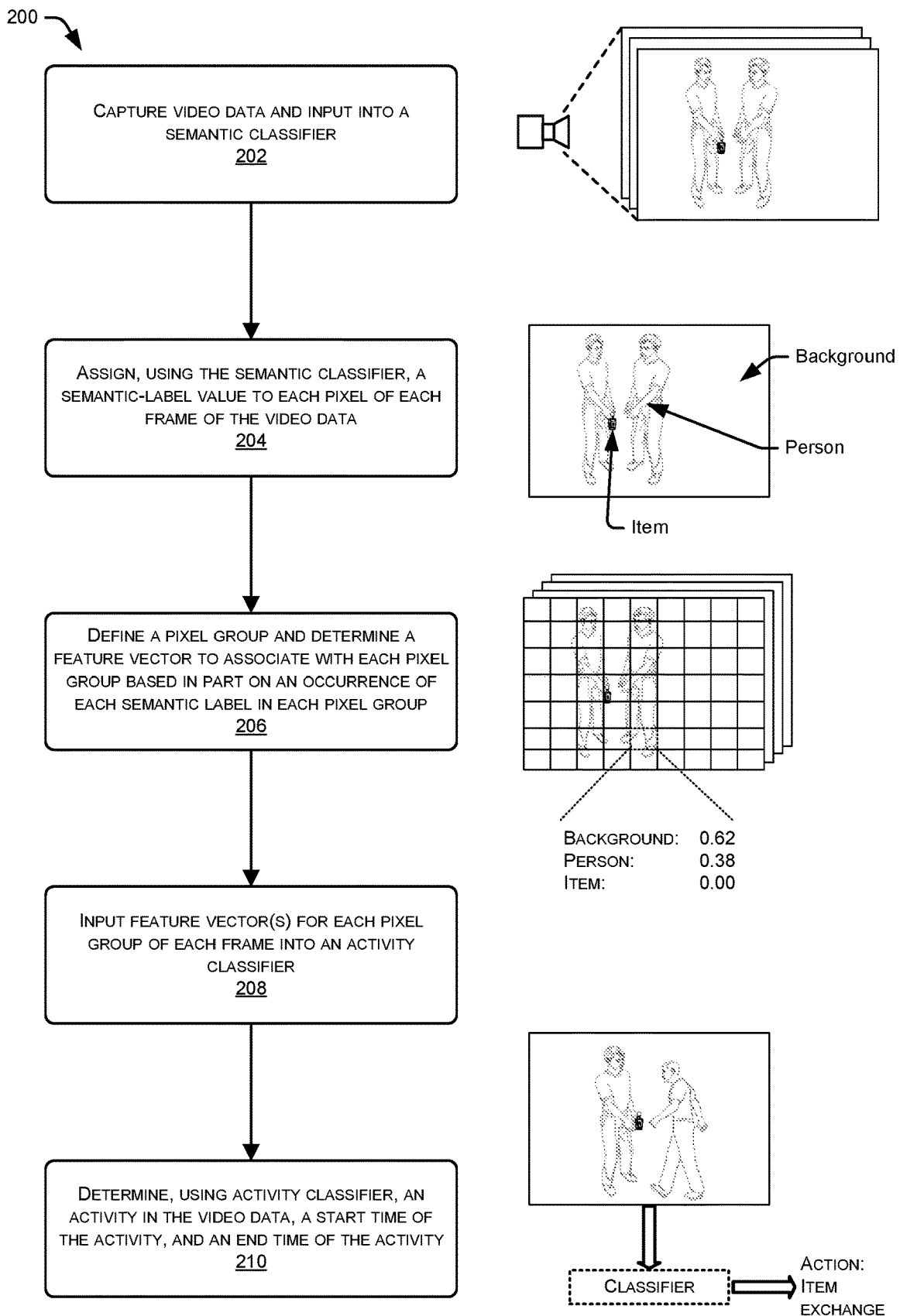
FIG. 2 illustrates a flow diagram of an example process for capturing video data, labeling the video data, and identifying predefined activity in the video data using an activity classifier.

FIG. 2 illustrates a flow diagram of an example process 200 for capturing video data, labeling the video data, and identifying predefined activity in the video data using an activity classifier. The processes discussed herein may be implemented in hardware, software, or a combination thereof. In the context of software, the described operations represent computer-executable instructions stored on one or more computer-readable storage media that, when executed by one or more hardware processors, perform the recited operations. Generally, computer-executable instructions include routines, programs, objects, components, data structures, and the like that perform particular functions or implement particular abstract data types. Those having ordinary skill in the art will readily recognize that certain steps or operations illustrated in the figures above may be eliminated, combined, or performed in an alternate order. Any steps or operations may be performed serially or in parallel. Furthermore, the order in which the operations are described is not intended to be construed as a limitation.

At an operation 202, a camera or other image sensor captures video data of a facility, which is input into a semantic classifier that is configured to semantically label the video data. That is, the semantic classifier may be configured to assign one of a number, n, values of a semantic label to each pixel of each frame of the video data. For example, each pixel may be associated with a value of "background", "person" or "item" in this example. At an operation 204, the semantic classifier may be used to assign such a semantic-label value to each of the pixels.

At an operation 206, the event-determination component 106 or another component may define a pixel group within each frame of the video data and determine, for each frame, one or more feature vectors to associate with the respective pixel group based at least in part on the semantic-label values assigned each pixel therein. In some instances, the event-determination component 106 may also analyze a spatiotemporal window surrounding the respective pixel group to make this determination, as discussed above and in more detail below with reference to FIG. 3.

At an operation 208, the event-determination component 106 or another component may input these feature vectors into one or more activity classifiers, each of which may be configured to determine whether the video data represents a certain predefined activity. At an operation 210, in this example the activity classifier detects the activity and, thus, outputs an indication of the activity along with a start time, an end time, and a location of the activity. In the illustrated example, for instance, the activity classifier determines that the video data depicts a first user passing an item to a second user over a certain time range.

Figure 3:
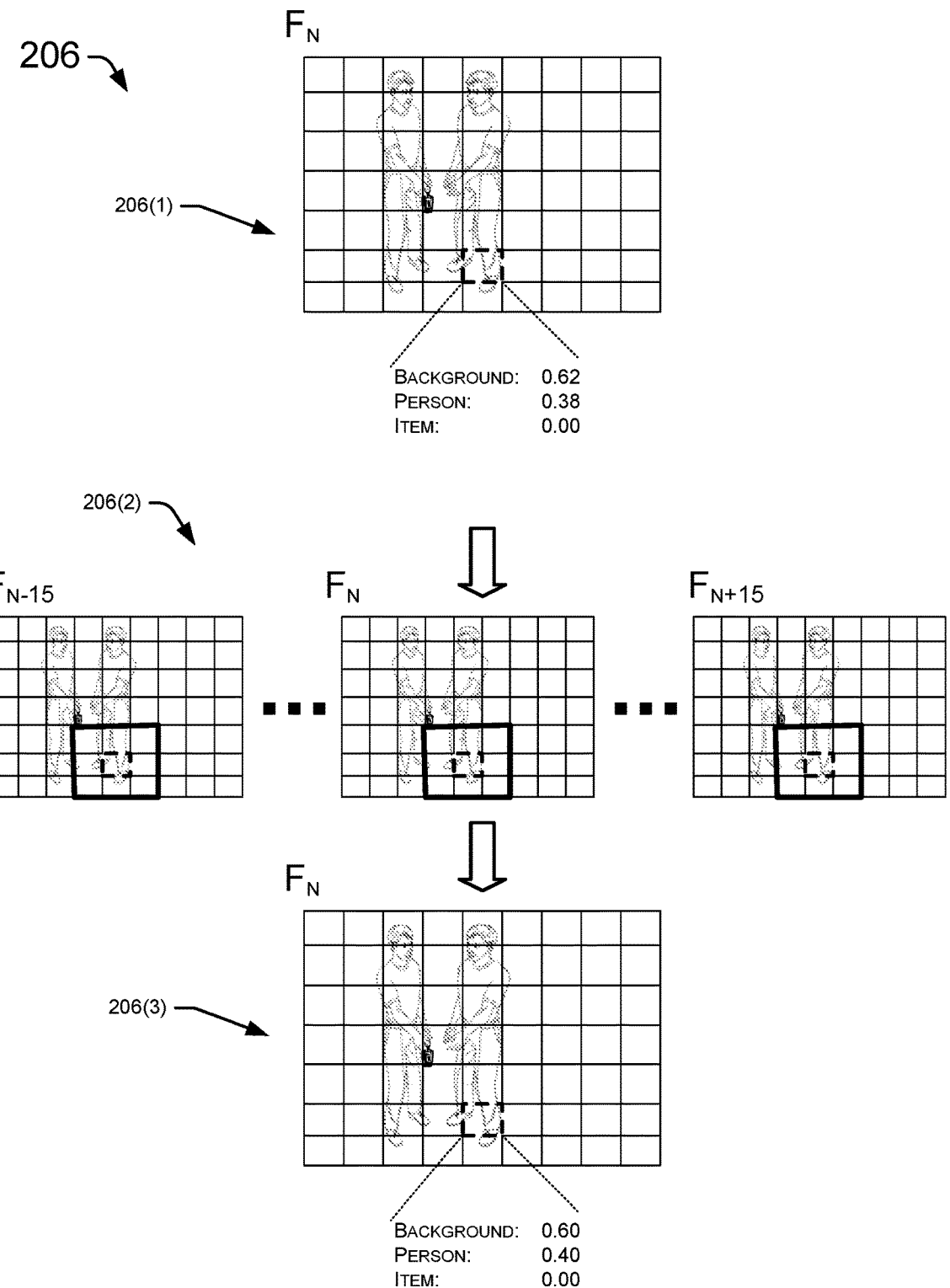
FIG. 3 illustrates an example manner in which one or more feature vectors may be calculated for association with a portion of an image of the video data. The feature vector(s) may comprise input into an activity classifier for identifying of a predefined activity.

FIG. 3 illustrates an example manner in which the operation 206 of the process 200 may be performed. That is, FIG. 3 illustrates one of many ways in which one or more feature vectors may be calculated for association with a portion of an image of the video data, such as with a pixel group having a predefined size (e.g., 10×10 pixel group, 100×100 pixel group, etc.) A sub-operation 206(1) illustrates that the event-determination component 106 may divide each frame into a number of groups (e.g., 63 groups in the illustration), with each of the groups comprising a W×H number of pixels. For each group, the event-determination component 106 may calculate a frequency of each label value. In the illustrated example, the event-determination component 106 has determined that the example group represents 62% background, 38% person, and 0% item. Of course, while this example describes three possible values of a semantic label, any other number may be used.

Next, an operation 206(2) represents that the event-determination component 106 may define a spatiotemporal window around the group from the operation 206(1). For instance, the event-determination component 106 may define a spatiotemporal window that has a spatial size of N×M (e.g., 3×3) pixel groups and a temporal size of a number of frames prior to the subject frame and a number of frames after the subject frame. In this example, the event-determination component 106 defines a spatiotemporal window that comprises a 3×3 spatial window that spans from 15 frames prior to the subject frame to 15 frames after the subject frame. Therefore, the spatiotemporal window includes pixels that neighbor the subject pixel group within the same frame, as well as pixels that correspond in location to the pixel, but in previous or subsequent frames.

After defining the spatiotemporal window, at the operation 206(2) the event-determination component 106 may calculate a frequency of each label value within the pixels of the spatiotemporal window. This frequency information may be used to calculate a feature vector to associate with the subject pixel group shown at the operation 206(1). That is, the analysis of the spatiotemporal window may provide context regarding the contents of the subject frame and, thus, may be used in determining the semantic values of the pixel groups within the subject frame. The operation 206(3) thus illustrates that the final semantic values associated with the pixel group may be different than if simply determined by analysis of the group in the subject frame alone. Further, while expressed as simple frequency values for simplicity of illustration, it is to be appreciated that this semantic information associated with the pixel group may be expressed as one or more feature vectors or in other ways. Further, while FIG. 3 illustrates an example with reference to a single pixel group, it is to be appreciated that these techniques may apply to each pixel group within the frame and for each frame.

Figure 4:
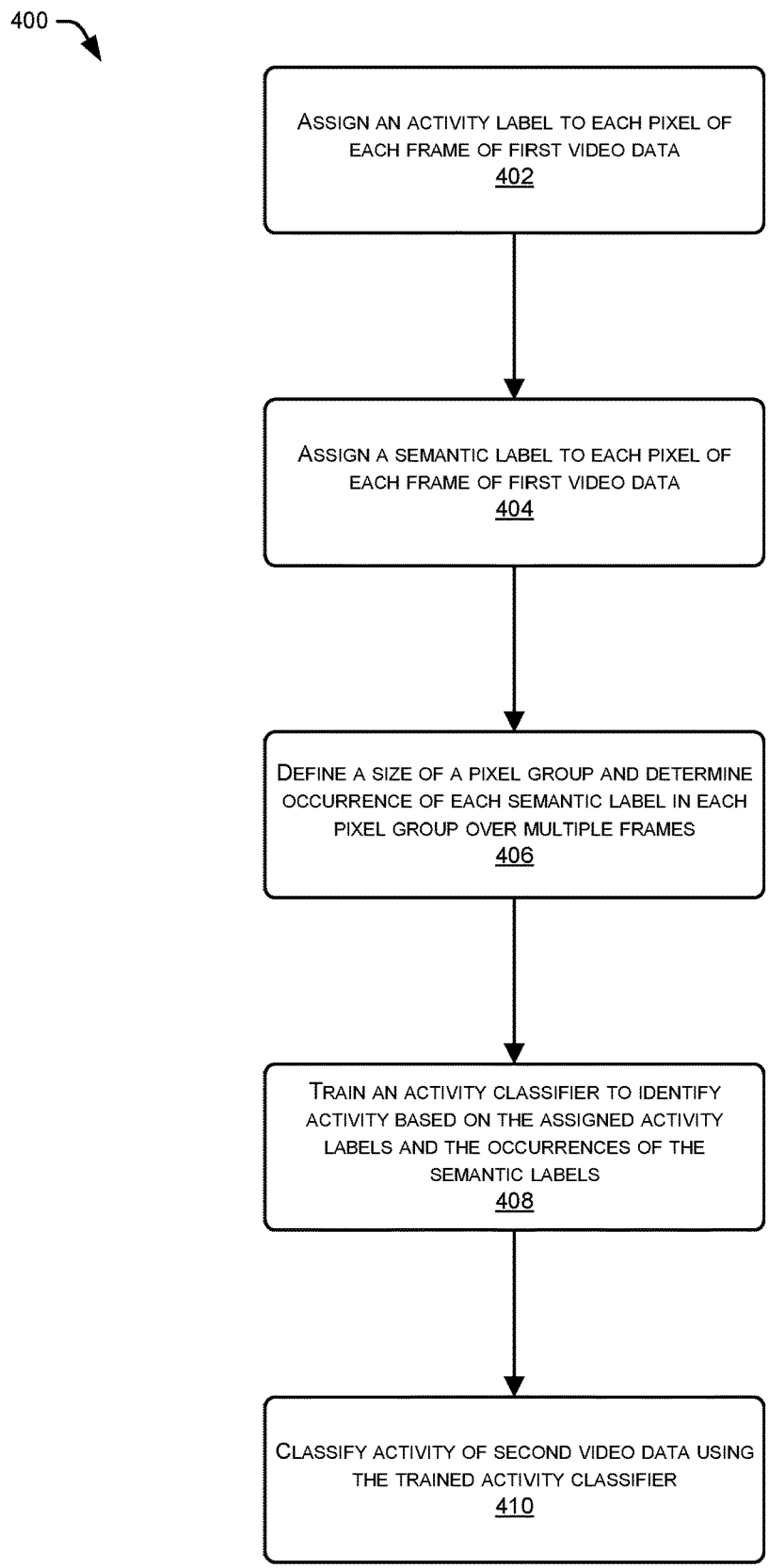
FIG. 4 illustrates a flow diagram of an example process for training a classifier for identifying certain activities in video data, as well as using the classifier to identify such activity in subsequently captured video data. As illustrated, the process includes training the classifier using video data to which semantic labels and activity labels have been assigned.

FIG. 4 illustrates a flow diagram of an example process 400 for training an activity classifier for identifying certain activities in video data, as well as using the classifier to identify such activity in subsequently captured video data. At an operation 402, a human user may manually assign an activity label to each pixel value of each from of first video data. For example, the human user may utilize computer-graphic tools, GUIs, or other input mechanisms to identify which frames include certain activity and which locations of the frames include this activity. For example, the human user may be tasked with identifying, within the first video data, activities such as in-shelf activities, off-shelf activities, and inter-person activities. In some instances, in-shelf activities may include a user picking an item from a shelf, a user returning an item to a shelf, or a user rummaging a shelf (e.g., placing his or her hand in or near the shelf without placing an item on the shelf or removing an item from the shelf). A non-shelf activity, meanwhile, may include a user interacting with an item in a location of a facility other than a shelf or the like, while an inter-person activity may include a first user handing an item to a second user or the like. Of course, while several example activities have been described, it is to be appreciated that the human user may be tasked with identifying any other type of activity, such as a user kicking a ball, a user running, trees swaying in the wind, cars moving in reverse, and/or the like.

In some instances, a user may use the afore-mentioned graphics tools to place a polygon or other shape atop a portion of a video that depicts a particular activity that the human user has been tasked with identifying. As such, the human user analyzing the video data may draw a polygon around the portion of the image frame at which the activity takes place, from the perspective of the human user. The human user may also indicate the activity label to apply to this video (e.g., item exchange between users, a user kicking a ball, etc.), as well as an end time of the activity. Thus, the human user may identify the start time, end time, and location within video data of a predefined event. Thereafter, pixel values of the frames between the start and end times and within the polygon may be assigned the activity label (e.g., item exchange), while the remaining pixel values of these frames may be assigned with another activity label, such as "no activity" (assuming the human user did not identify another activity in this portion of the video data). In some instances, each pixel value of each frame may be associated by default with "no activity", absent an indication to the contrary from the human user.

As the reader will appreciate one or more human users may continue to assign activity labels to video data over time such as a substantial corpus of activity-labeled video data is stored. At an operation 404, the human user(s) may also manually assign semantic labels to each pixel value of each frame of the same and/or different video data. Again, the human user may utilize computer-graphics tools, GUIs, or other input mechanisms to assign the semantic labels to the frames. In some instances, the semantic labels may include background, head, body, arm (or forearm), hand, item (or item in hand), and/or the like. Of course, while a few example semantic labels are described it is to be appreciated that additional and/or alternative labels may be used. Further, in some instances each pixel value of each frame may be assigned a default value of "background" absent contrary instruction from the human user.

At an operation 406, a size of pixel group may be defined and an occurrence of each semantic label in each pixel group may be determined over multiple frames. For example, a "bin size" of ten pixels by ten pixels (or any other size) may be defined, and the normalized amount of each semantic label within each group (or "bin") may be determined. In some instances, this amount may be determined for a subject frame, as well as for a certain number of frames before and/or after the subject frame, such as for fifteen frames prior to the subject frame and fifteen frames after the subject frame. The occurrence of each semantic label over these multiple frames may then be used to determine a final semantic label to apply to each pixel value of the pixel group of the subject frame. Further, this process may occur for each pixel group of each frame of the subject video data to summarize the semantic regions of the video data.

At 408, a classifier for identifying certain activity may be trained based on the assigned activity labels and the respective occurrences of the semantic labels. As described above, an SVM may be trained in some instances, although other classifiers may also be used. In some instances, the SVM may compute the maximum-margin hyperplane between positive and negative examples of each predefined activity, such as the user picking an item from a shelf in a facility. In these instances, a positive example of a particular activity label corresponds to any semantic histogram feature that was computed for a temporal window around a particular pixel that has been labeled with the particular activity label, while a negative example is the complement of all positive examples.

As noted above, however, the number of negative examples of a particular activity label in the training data may outweigh the number of positive examples and, therefore, the training data may be sampled and, in some instances, augmented prior to training the classifier. For instance, positive examples may be identified, copied and then modified, such as by via random cropping, rotations, and/or resizing, to generate additional, albeit synthetic positive examples. The sampled training data and the synthetically generated training data may then be input as training data for training the classifier. In some instances, an SVM may be trained using stochastic gradient descent which iteratively updates the parameters of the model.

At an operation 410, the process 400 represents that second video data may be input into the classifier to identify activity in the second video data. For example, if the classifier has been trained to identify certain activities such as an item picking an item from a shelf, returning an item to a shelf, exchanging items with another user, a user kicking a ball, cars driving in reverse, or the like, the classifier may identify respective start times, end times, locations in the second video data, and corresponding activity labels for these events.

Figure 5:
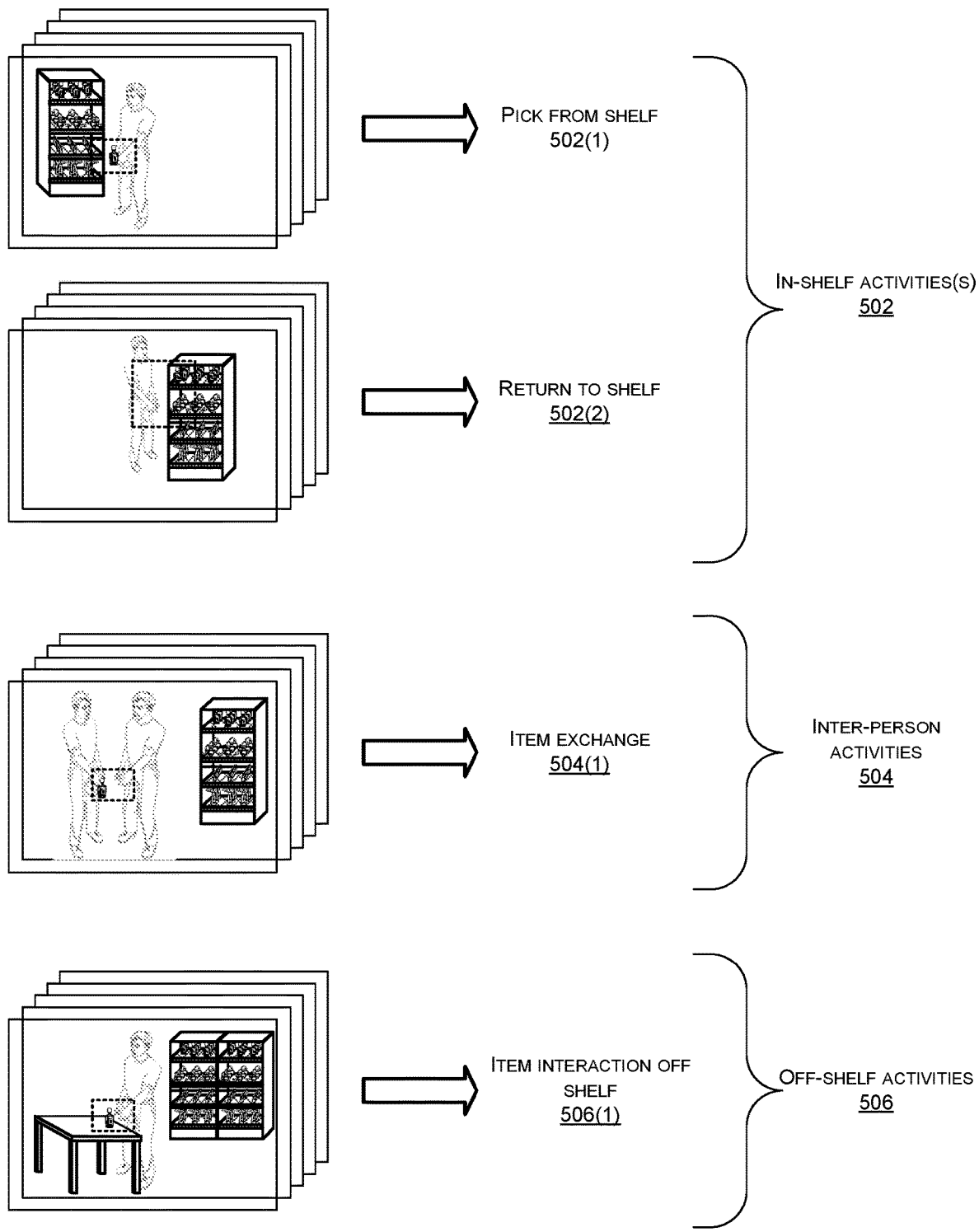
FIG. 5 illustrates example activity labels that may be applied frames of video data for training the classifier, as well as the types of activities that may be identified in subsequently captured video data.

FIG. 5 illustrates example activity labels that may be applied frames of video data for training the activity classifier, as well as the types of activities that may be identified in subsequently captured video data. While this figure describes example activity labels, it is to be appreciated that other classifiers may be trained to identify additional and/or alternative activities.

As illustrated, in some instances a classifier may be trained to identify three main types of activities, known as in-shelf activities 502, inter-person activities 504, and off-shelf activities 506. The in-shelf activities 502 may include an activity 502(1) of a user picking an item from a shelf or other predefined location. For example, in a retail environment, the activity 502(1) may correspond to a customer physically removing an item from a shelf within a retail store, sometime after which the user may leave the facility with the picked item. In some instances, identifying this activity allows an inventory management system to add an item identifier corresponding to the picked item to a virtual cart associated with the user, such that a payment instrument of the user may later be charged for a cost of the picked item, assuming the user in fact leaves the retail store with the item. An activity 502(2), meanwhile, corresponds to a customer placing an item back onto a shelf or other predefined location. In this example, identifying this example may ensure that the user is not in fact charged for the cost of the item, given that he or she is not existing the facility with the item.

The inter-person activities 504, meanwhile, may include an activity 504(1) of a first user handing an item to a second user. Identification of this type of activity may allow the inventory management system to remove the corresponding item identifier from the virtual cart of the first user (given that he or she no longer possesses the item) and adding the corresponding item identifier to the virtual cart of the second user (given that he or she now possesses the item). Finally, the off-shelf activities 506 may include an activity 506(1), which may include a user interacting with an item located in a location other than a shelf or other predefined location. Identification of this event may result in the video being analyzed by a human user to determine the idea picked or returned by the user, given that the item is not at a location at which the item is expected to be, thus making the identity of the item not readily known. Again, while FIG. 5 illustrates example activities, other classifiers may be trained to identify one or more different and/or additional activities.

Figure 6:
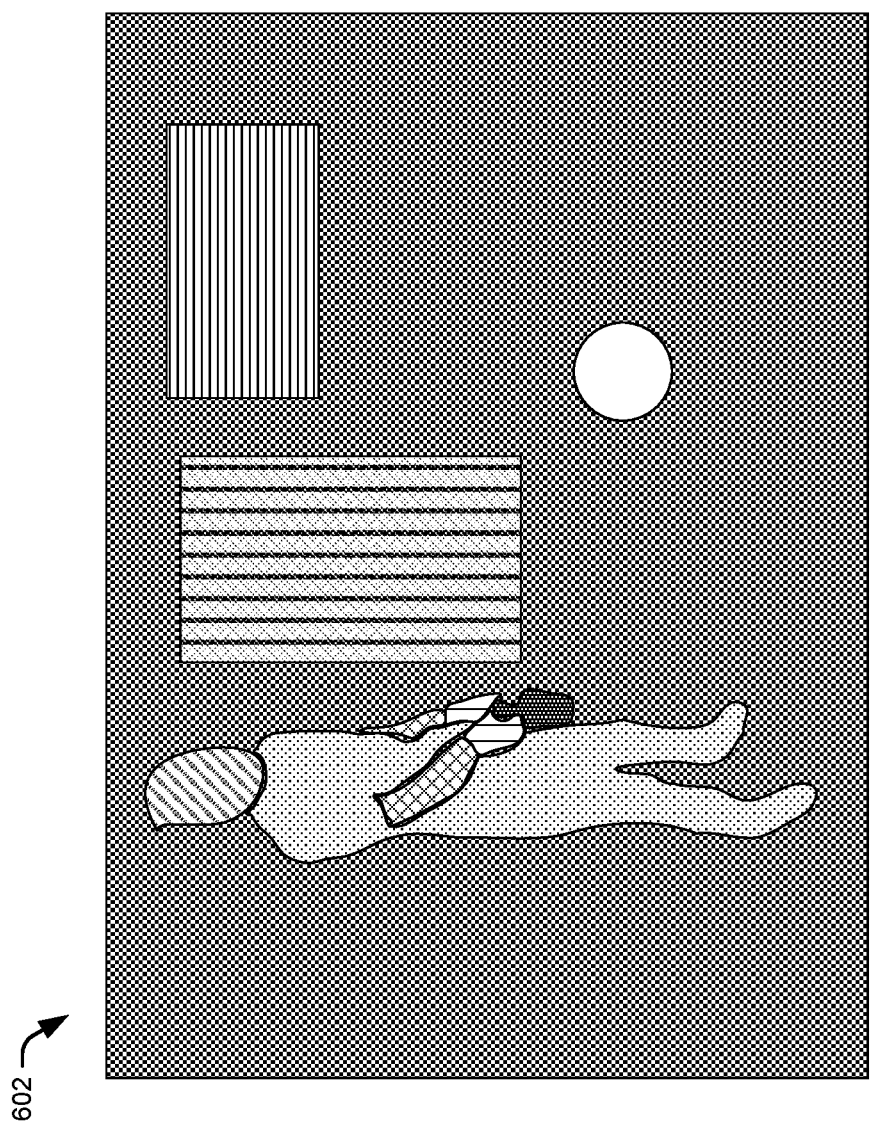
FIG. 6 illustrates an example frame of video data that been associated with example semantic labels. As illustrated, each pixel value of the frame of video data has been associated with a semantic label, such as background, head, body, arm, hand, or item.

FIG. 6 illustrates an example frame 602 of video data that been associated with example semantic labels, such as background 604, head 606, body 608, arm 610, hand 612, and item (or item in hand) 614, a ball 616, a door 618, a display 620, and/or any other type of semantic label. As noted above, a human user may use computer-graphics tools to assign the respective semantic labels 604-614 to the different regions of the frame 602. Further, after one or more of the human users assign these semantic labels to a threshold amount of video data, a classifier may be trained to apply the semantic labels to still additional video data. As noted both above and below, the video data that has been both labeled with activity labels and semantic labels may then be used as training data for training a model that is configured to identify the predefined activities, such as the activities 502-506.

Figure 7:
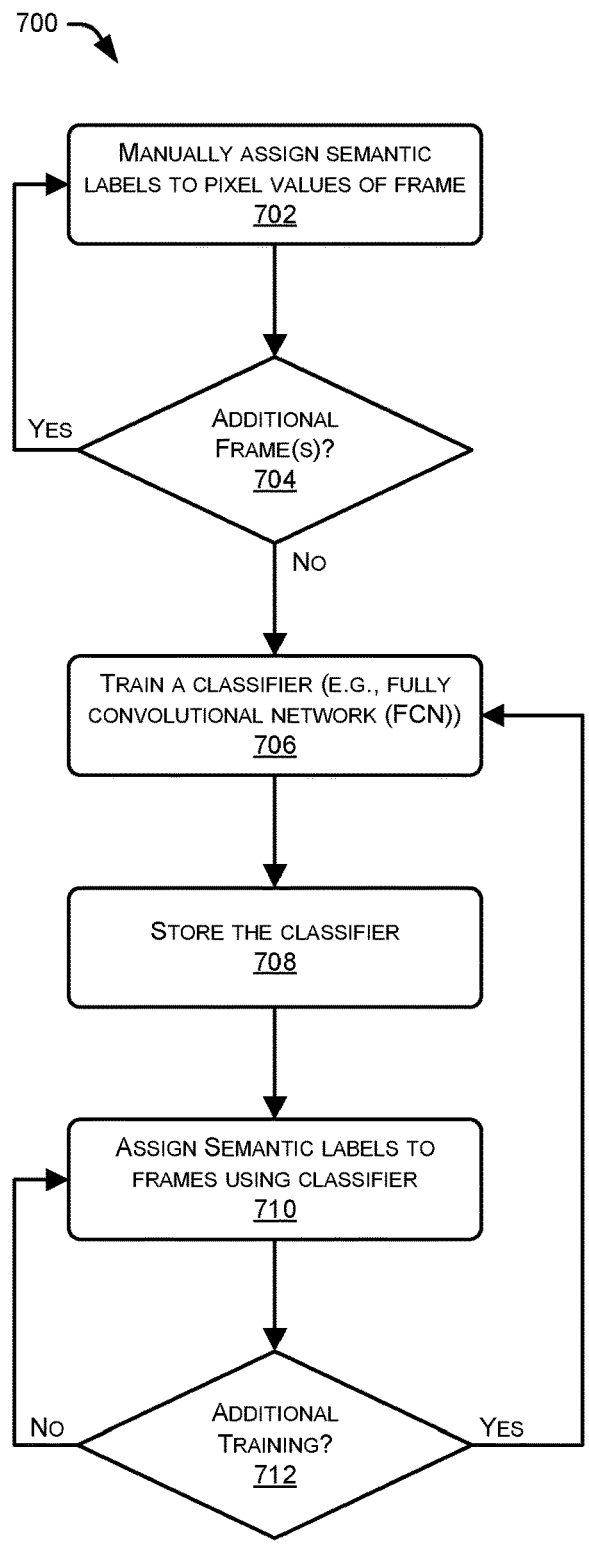
FIG. 7 illustrates a flow diagram of an example process for training and using a classifier for assigning semantic labels to frames of video data.

FIG. 7 illustrates a flow diagram of an example process 700 for training and using a classifier for assigning semantic labels to frames of video data. At an operation 702, semantic labels, such as those described above with reference to FIG. 5, are manually assigned to pixel values of each frame of video data. For example, a human user may use computer-based tools to draw a polygon or other shape around different regions of the video frames to identify which regions correspond to which labels. In still other instances, computer-vision tools may be used to segment objects from with the video tool such that the user may then request to assign different labels to the different segmented regions.

At 704, the process 400 determines where additional frames are to be semantically labeled. If so, the process returns to operation 702 to manually assign the semantic labels to the additional frames. If not, then at an operation 706 a semantic classifier, such as an FCN, is trained for semantically labeling still additional video data. As noted above, an encoder/decoder scheme may be utilized where images are encoded into low-level features and a decoder network decodes them into an output, such as semantic labels. Further, given the ground-truth segmentations, the FCN or other classifier may be updated iteratively using stochastic gradient descent, which may minimize an error function that penalizes the model from predicted values that differ from ground truth. After such a classifier, such as the FCN, is trained, the classifier may be improved as additional data is collective. For instance, a human user may provide periodic or continuous feedback to the model to correct errors, with these errors and corrections being propagated back through the classifier to fine-tune the parameters of the classifier.

After training, at an operation 708 the classifier may be stored and, at an operation 710, may be used to assign semantic labels to frames of additional video data. For example, the classifier may be configured to receive video data and determine a grid of probabilities indication, a probability that each pixel of a frame or over multiple frames depicts a respective particular semantic label (e.g., head, background, etc.). Given that subsequent operations may utilize one defined semantic label per pixel (over one or more multiple frames of the video data), this probability grid may be converted into a discrete segmentation mask. The output of the FCN may thus be post-processed with a Dense Conditional Random Field (CRF) to ensure that neighboring pixels over one or more frames with similar RGB/RGB-D values are similar. The grid may be densely connected with an edge for each pair of neighboring pixels. A binary potential may thus result in spatiotemporal consistency, while a unary potential may help ensure that the output is faithful to input probability map.

An operation 712 determines whether the classifier is to receive additional training. If so, then the process 700 loops back to the operation 706. If not, then the process 400 loops back to continue to assign semantical labels to additional video data.

Figure 8:
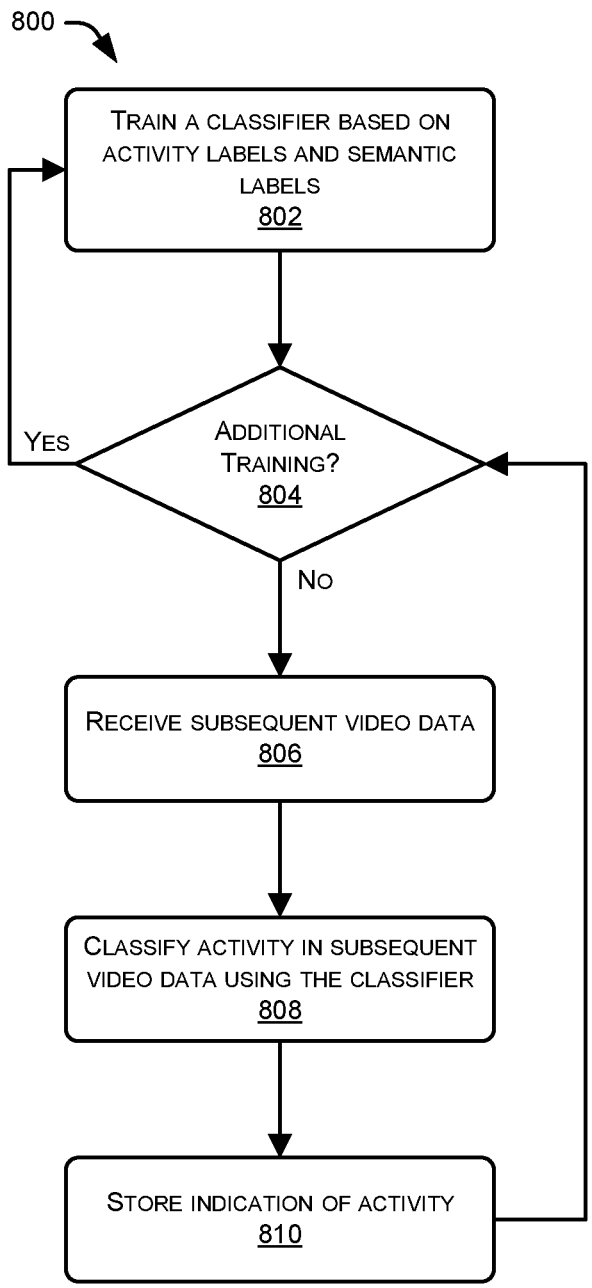
FIG. 8 illustrates a flow diagram of an example process for training and using a classifier for identifying activity in video data.

FIG. 8 illustrates a flow diagram of an example process 800 for training and using an activity classifier for identify activity in video data using video data that has been labeled with both activity labels and semantic labels. At an operation 802, an activity classifier is trained based on the aforementioned training data. In some instance, the classifier may comprise an SVM or other type of classifier, which computes the maximum-margin hyperplane between positive and negative examples of each predefined activity. As noted above, a positive example of a particular activity label corresponds to any semantic histogram feature that was computed for temporal window around a particular pixel that has been labeled with the particular activity label, while a negative example is the complement of all positive examples.

In order to train the activity classifier with a sufficient number of positive examples, the training data may be sampled and, in some instances, augmented prior to training the classifier. For instance, positive examples may be identified, copied and then modified, such as by via random cropping, rotations, and/or resizing, to generate additional, albeit synthetic positive examples. The sampled training data and the synthetically generated training data may then be input as training data for training the classifier.

After training the activity classifier using training data, an operation 804 determines whether additional training is to be done. If so, then the process 800 returns to the process 802. If not, then the process proceeds to an operation 806, at which point subsequent video data is received. For instance, video data from a particular camera within a facility may be received and, at an operation 808, activity illustrated in the subsequent video data may be identified and classified using the activity classifier. For example, activity the classifier may be used to identify a user picking an item from a shelf, returning an item to a shelf, exchanging an item with another user, and/or any of the activities described with reference to FIG. 5 or otherwise. At an operation 810, an indication of the identified activity may be stored. For example, if the activity comprises a user picking an item from a shelf, the activity may be stored such that an item identifier corresponding to the picked item may be stored in a virtual cart of the corresponding user. The process 800 may then return to the operation 804.

Figure 9A:
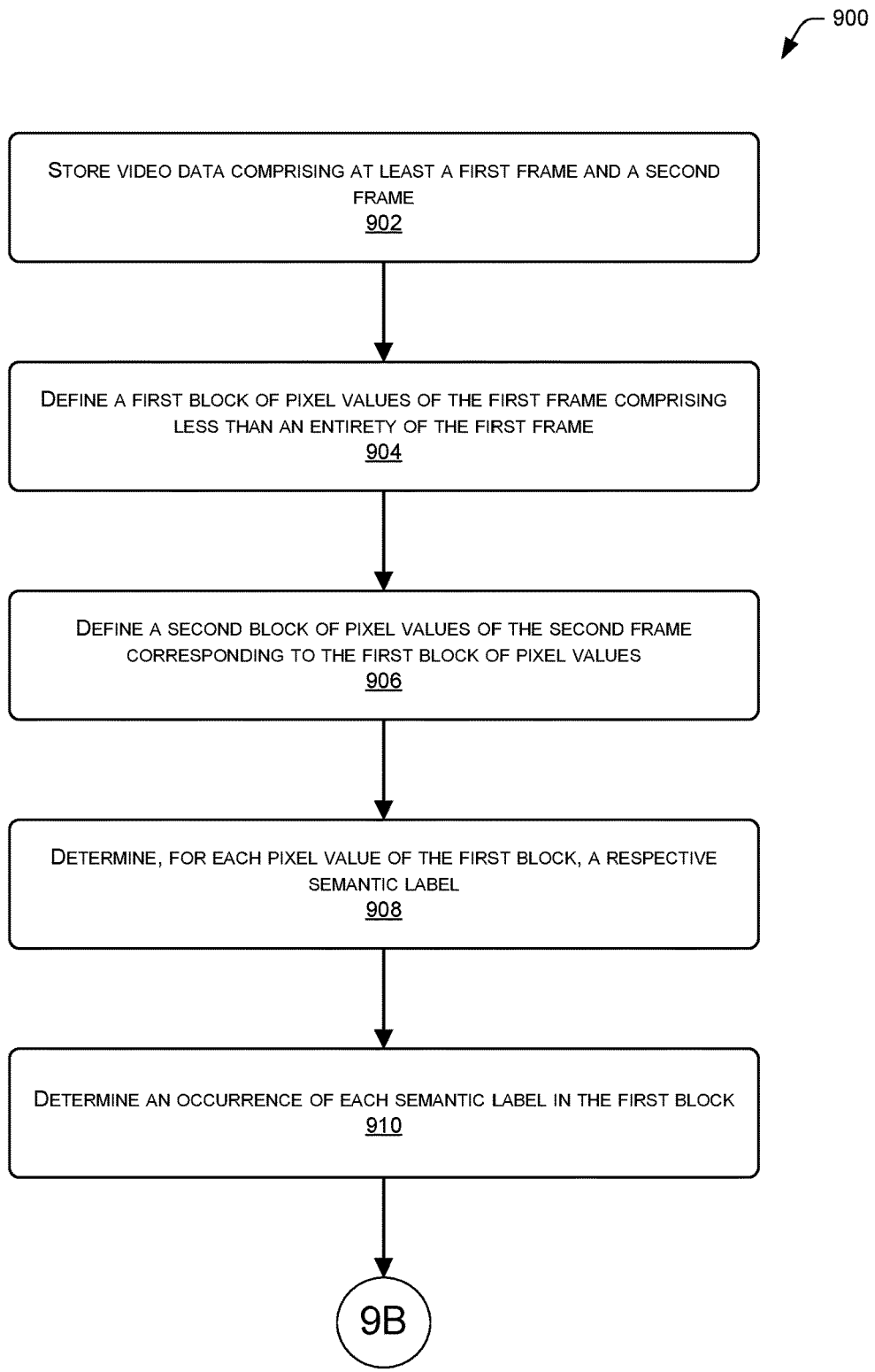
FIGS. 9A-B collectively illustrate a flow diagram of another example process for assigning final semantic labels to pixel values of a video frame by analyzing semantic values applied to pixel groups from frames prior to and subsequent to the video frame.
Figure 9B:
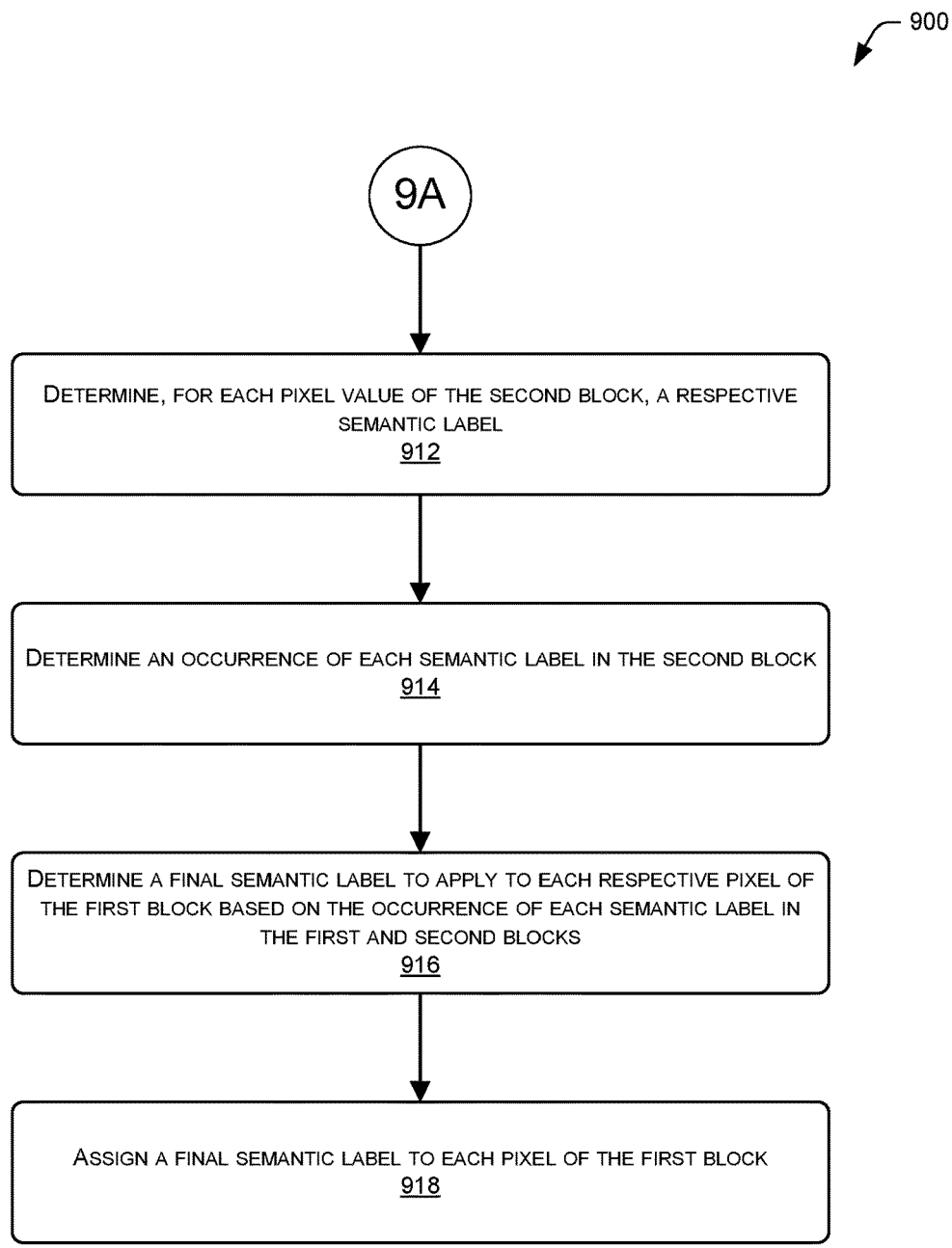

FIGS. 9A-B collectively illustrate a flow diagram of another example process 900 for assigning final semantic labels to pixel values of a video frame by analyzing semantic values applied to pixel groups from frames prior to and subsequent to the video frame. At an operation 902, a component, such as the event-determination component 106, may store video data comprising at least a first frame and a second frame, the second frame being adjacent to the first frame in the video data. At an operation 904, the event-determination component may then define a first block of pixel values of the first frame, the first block of pixel values comprising less than an entirety of the first frame. Likewise, an operation 906 represents the event-determination component defining a second block of pixel values of the second frame, the second block of pixel values corresponding in location to the first block of pixel values.

At an operation 908, a semantic label for each pixel value of the first block is determined, while at an operation 910 the event-determination component may determine, based at least in part on the respective semantic labels that have been assigned to the respective pixel values of the first block of pixel values, an occurrence of each respective semantic label in the first block of pixel values.

FIG. 9B continues the illustration of the process 900 and includes, at an operation 912, the event-determination component determining, for each pixel value of the second block of pixel values, a respective semantic label that has been assigned to the respective pixel value of the second block of pixel values. At an operation 914, the component determines, based at least in part on the respective semantic labels that have been assigned to the respective pixel values of the second block of pixel values, an occurrence of each respective semantic label in the second block of pixel values. An operation 916 represents determining, based at least in part on the occurrence of each respective semantic label in the first block of pixel values and the occurrence of each respective semantic label in the second block of pixel values, a respective final semantic label to assign to each respective pixel value of the first block of pixel values. Finally, an operation 910 represents assigning a final semantic label to each pixel of the first block.

Figure 10:
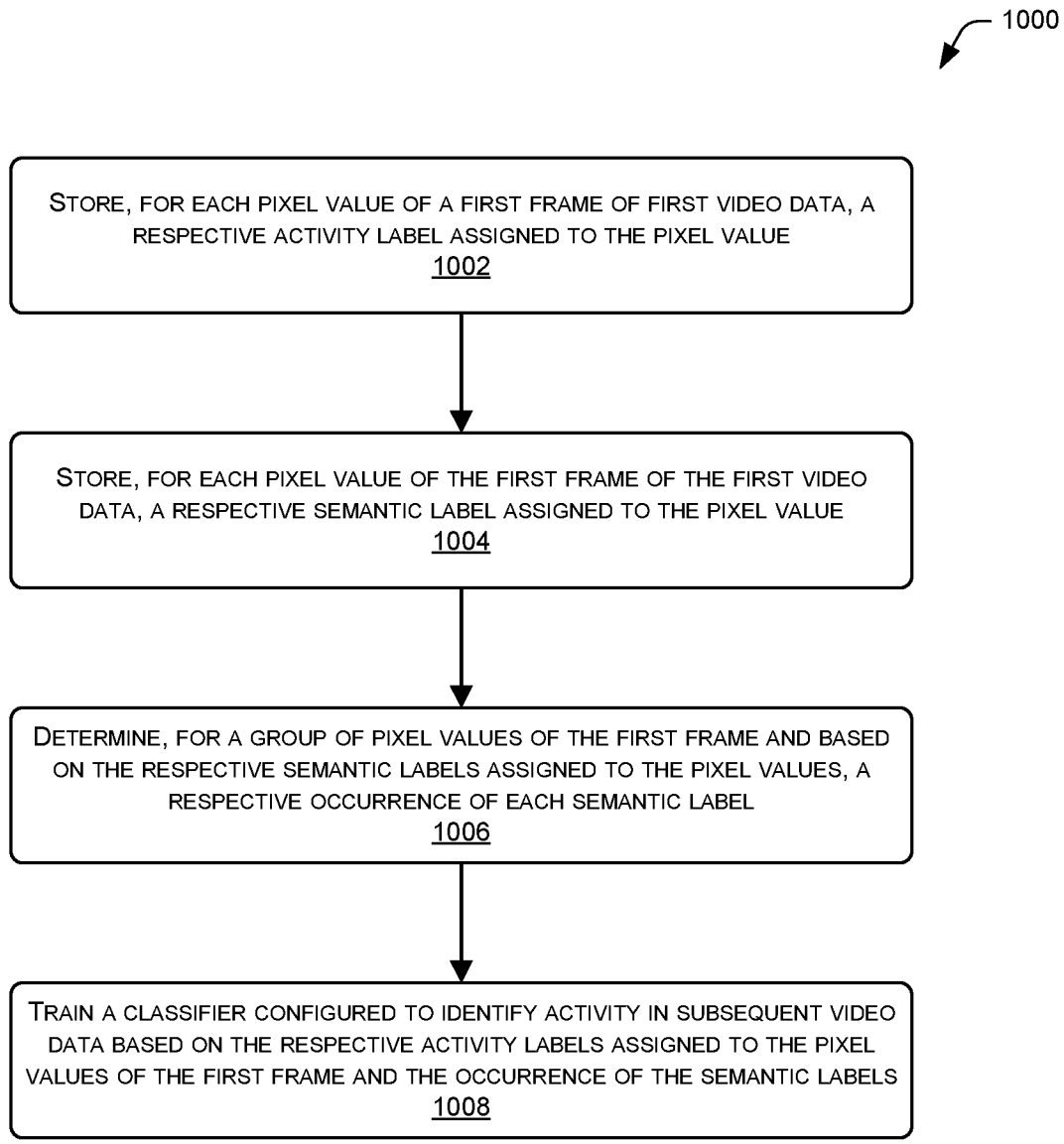
FIG. 10 illustrates a flow diagram of another example process for training a classifier for identify certain activity in video data.

FIG. 10 illustrates a flow diagram of another example process 1000 for training an activity classifier for identify certain activity in video data. An operation 1002 represents storing, for each pixel value of a first frame of first video data, a respective activity label assigned to the respective pixel value of the first frame. As described above, in some instances the respective activity labels may be assigned based on input from human users. An operation 1004 represents storing, for each pixel value of a first frame of the first video data, a respective semantic label assigned to the respective pixel value of the first frame. Again, the respective semantic labels may be assigned based on input from human users. In addition or in the alternative, some or all of the semantic labels may be applied using a semantic-label classifier (e.g., an FCN).

Next, an operation 1006 represents determining, for a group of pixel values of the first frame and based at least in part on respective semantic labels assigned to pixel values of the group of pixel values, a respective occurrence of each semantic label in the group of pixel values. For example, this operation may represent generating a histogram indicating an occurrence of each semantic label in the respective pixel group. Finally, an operation 808 represents training a classifier configured to identify activity in subsequent video data, the training based at least in part on (i) the respective activity labels assigned to the respective pixel values of the first frame, and (ii) the respective occurrences of the semantic labels in the group of pixel values. As described above, training this classifier may include creating an SVM based on positive and negative examples of the activity labels represented by the training data.

Figure 11:
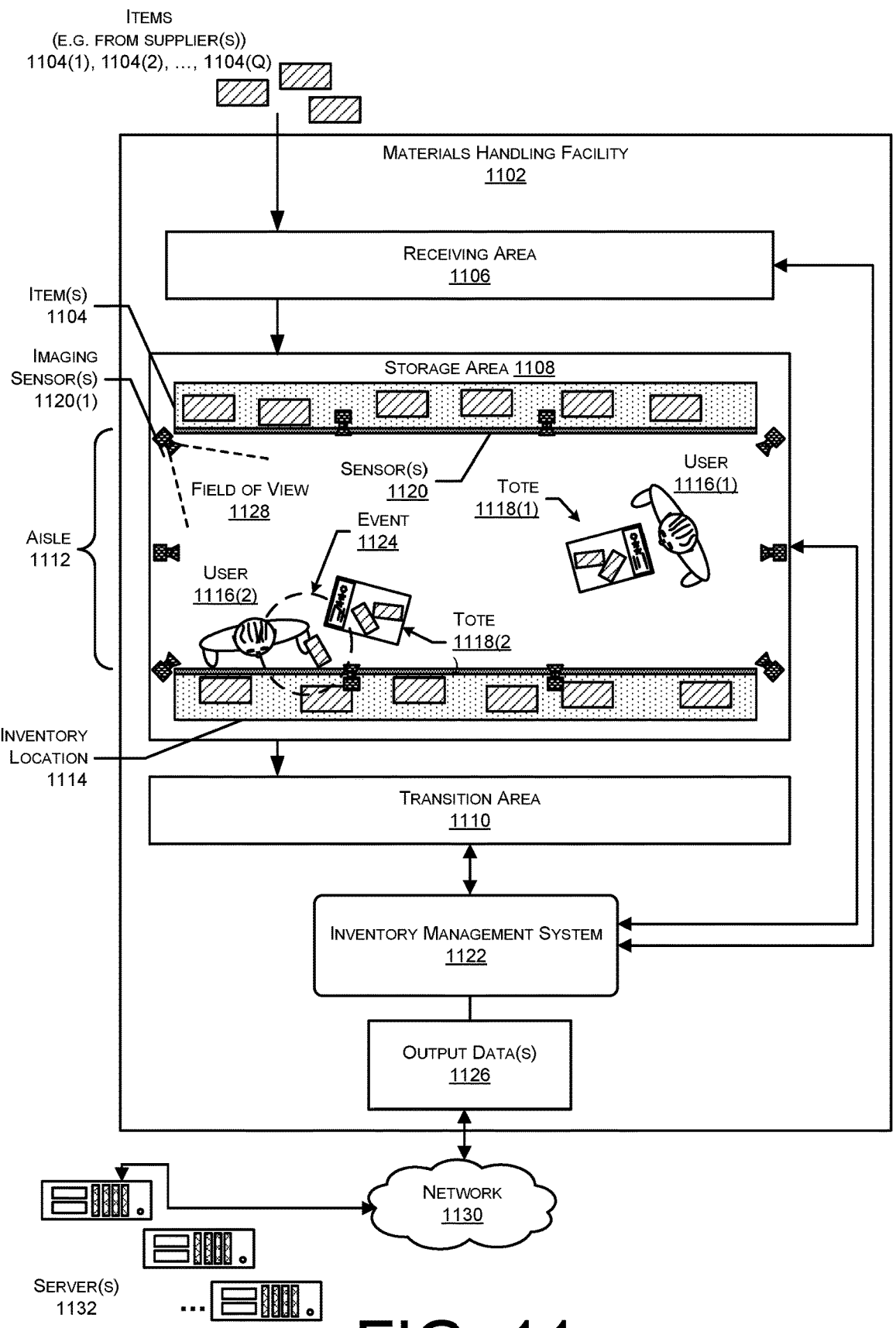
FIG. 11 is a block diagram of an example materials handling facility that includes sensors and an inventory management system configured to generate output regarding events occurring in the facility using the sensor data.
Figure 12:
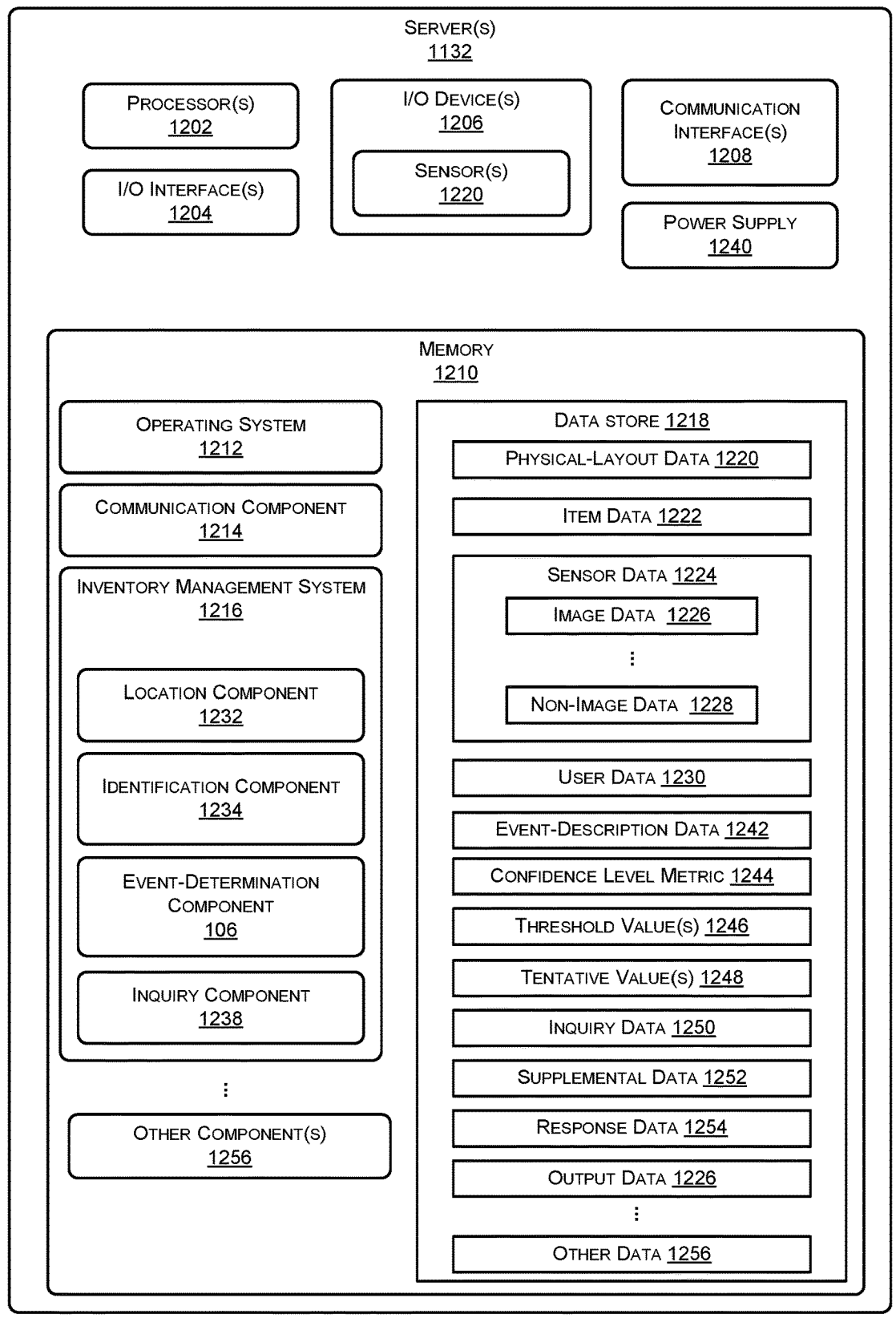
FIG. 12 illustrates a block diagram of one or more servers configured to support operation of the facility.

FIGS. 11 and 12 represent an illustrative materials handling environment, such as the materials handling facility 1102, in which the techniques described herein may be applied to cameras monitoring the environments as described below. However, the following description is merely one illustrative example of an industry and environment in which the techniques described herein may be utilized. The materials handling facility 1102 (or "facility") comprises one or more physical structures or areas within which one or more items 1104(1), 1104(2), . . . , 1104(Q) (generally denoted as 1104) may be held. As used in this disclosure, letters in parenthesis such as "(Q)" indicate an integer result. The items 1104 comprise physical goods, such as books, pharmaceuticals, repair parts, electronic gear, groceries, and so forth.

The facility 1102 may include one or more areas designated for different functions with regard to inventory handling. In this illustration, the facility 1102 includes a receiving area 1106, a storage area 1108, and a transition area 1110. The receiving area 1106 may be configured to accept items 1104, such as from suppliers, for intake into the facility 1102. For example, the receiving area 1106 may include a loading dock at which trucks or other freight conveyances unload the items 1104.

The storage area 1108 is configured to store the items 1104. The storage area 1108 may be arranged in various physical configurations. In one implementation, the storage area 1108 may include one or more aisles 1112. The aisle 1112 may be configured with, or defined by, inventory locations 1114 on one or both sides of the aisle 1112. The inventory locations 1114 may include one or more of shelves, racks, cases, cabinets, bins, floor locations, or other suitable storage mechanisms for holding or storing the items 1104. The inventory locations 1114 may be affixed to the floor or another portion of the facility's structure, or may be movable such that the arrangements of aisles 1112 may be reconfigurable. In some implementations, the inventory locations 1114 may be configured to move independently of an outside operator. For example, the inventory locations 1114 may comprise a rack with a power source and a motor, operable by a computing device to allow the rack to move from one location within the facility 1102 to another.

One or more users 1116(1), 1116(2), . . . , 1116(U), totes 1118(1), 1118(2), . . . , 1118(T) (generally denoted as 1118) or other material handling apparatus may move within the facility 1102. For example, the users 1116 may move about within the facility 1102 to pick or place the items 1104 in various inventory locations 1114, placing them on the totes 1118 for ease of transport. An individual tote 1118 is configured to carry or otherwise transport one or more items 1104. For example, a tote 1118 may include a basket, a cart, a bag, and so forth. In other implementations, other agencies such as robots, forklifts, cranes, aerial drones, and so forth, may move about the facility 1102 picking, placing, or otherwise moving the items 1104.

One or more sensors 1120 may be configured to acquire information in the facility 1102. The sensors 1120 in the facility 1102 may include sensors fixed in the environment (e.g., ceiling-mounted cameras) or otherwise, such as sensors in the possession of users (e.g., mobile phones, tablets, etc.). The sensors 1120 may include, but are not limited to, cameras 1120(1), weight sensors, radio frequency (RF) receivers, temperature sensors, humidity sensors, vibration sensors, and so forth. The sensors 1120 may be stationary or mobile, relative to the facility 1102. For example, the inventory locations 1114 may contain cameras 1120(1) configured to acquire images of pick or placement of items 1104 on shelves, of the users 1116(1) and 916(2) in the facility 1102, and so forth. In another example, the floor of the facility 1102 may include weight sensors configured to determine a weight of the users 1116 or other object thereupon.

During operation of the facility 1102, the sensors 1120 may be configured to provide information suitable for tracking how objects move or other occurrences within the facility 1102. For example, a series of images acquired by a camera 1120(1) may indicate removal of an item 1104 from a particular inventory location 1114 by one of the users 1116 and placement of the item 1104 on or at least partially within one of the totes 1118.

While the storage area 1108 is depicted as having one or more aisles 1112, inventory locations 1114 storing the items 1104, sensors 1120, and so forth, it is understood that the receiving area 1106, the transition area 1110, or other areas of the facility 1102 may be similarly equipped. Furthermore, the arrangement of the various areas within the facility 1102 is depicted functionally rather than schematically. For example, multiple different receiving areas 1106, storage areas 1108, and transition areas 1110 may be interspersed rather than segregated in the facility 1102.

The facility 1102 may include, or be coupled to, an inventory management system 1122. The inventory management system 1122 is configured to identify interactions with and between users 1116, devices such as sensors 1120, robots, material handling equipment, computing devices, and so forth, in one or more of the receiving area 1106, the storage area 1108, or the transition area 1110. These interactions may include one or more events 1124. For example, events 1124 may include the entry of the user 1116 to the facility 1102, stocking of items 1104 at an inventory location 1114, picking of an item 1104 from an inventory location 1114, returning of an item 1104 to an inventory location 1114, placement of an item 1104 within a tote 1118, movement of users 1116 relative to one another, gestures by the users 1116, and so forth. Other events 1124 involving users 1116 may include the user 1116 providing authentication information in the facility 1102, using a computing device at the facility 1102 to authenticate identity to the inventory management system 1122, and so forth. Some events 1124 may involve one or more other objects within the facility 1102. For example, the event 1124 may comprise movement within the facility 1102 of an inventory location 1114, such as a counter mounted on wheels. Events 1124 may involve one or more of the sensors 1120. For example, a change in operation of a sensor 1120, such as a sensor failure, change in alignment, and so forth, may be designated as an event 1124. Continuing the example, movement of a camera 1120(1) resulting in a change in the orientation of the field of view 1128 (such as resulting from someone or something bumping the camera 1120(1)) (e.g. camera 104) may be designated as an event 1124.

By determining the occurrence of one or more of the events 1124, the inventory management system 1122 may generate output data 1126. The output data 1126 comprises information about the event 1124. For example, where the event 1124 comprises an item 1104 being removed from an inventory location 1114, the output data 1126 may comprise an item identifier indicative of the particular item 1104 that was removed from the inventory location 1114 and a user identifier of a user that removed the item.

The inventory management system 1122 may use one or more automated systems to generate the output data 1126. For example, an artificial neural network, one or more classifiers, or other automated machine learning techniques may be used to process the sensor data from the one or more sensors 1120 to generate output data 1126. For example, the inventory management system may perform some or all of the techniques for generating and utilizing a classifier for identifying user activity in image data, as described in detail above. The automated systems may operate using probabilistic or non-probabilistic techniques. For example, the automated systems may use a Bayesian network. In another example, the automated systems may use support vector machines to generate the output data 1126 or the tentative results. The automated systems may generate confidence level data that provides information indicative of the accuracy or confidence that the output data 1126 or the tentative data corresponds to the physical world.

The confidence level data may be generated using a variety of techniques, based at least in part on the type of automated system in use. For example, a probabilistic system using a Bayesian network may use a probability assigned to the output as the confidence level. Continuing the example, the Bayesian network may indicate that the probability that the item depicted in the image data corresponds to an item previously stored in memory is 95%. This probability may be used as the confidence level for that item as depicted in the image data.

In another example, output from non-probabilistic techniques such as support vector machines may have confidence levels based on a distance in a mathematical space within which the image data of the item and the images of previously stored items have been classified. The greater the distance in this space from a reference point such as the previously stored image to the image data acquired during the occurrence, the lower the confidence level.

In yet another example, the image data of an object such as an item 1104, user 1116, and so forth, may be compared with a set of previously stored images. Differences between the image data and the previously stored images may be assessed. For example, differences in shape, color, relative proportions between features in the images, and so forth. The differences may be expressed in terms of distance with a mathematical space. For example, the color of the object as depicted in the image data and the color of the object as depicted in the previously stored images may be represented as coordinates within a color space.

The confidence level may be determined based at least in part on these differences. For example, the user 1116 may pick an item 1104(1) such as a perfume bottle that is generally cubical in shape from the inventory location 1114. Other items 1104 at nearby inventory locations 1114 may be predominately spherical. Based on the difference in shape (cube vs. sphere) from the adjacent items, and the correspondence in shape with the previously stored image of the perfume bottle item 1104(1) (cubical and cubical), the confidence level that the user 104 has picked up the perfume bottle item 1104(1) is high.

In some situations, the automated techniques may be unable to generate output data 1126 with a confidence level above a threshold result. For example, the automated techniques may be unable to distinguish which user 1116 in a crowd of users 1116 has picked up the item 1104 from the inventory location 1114. In other situations, it may be desirable to provide human confirmation of the event 1124 or of the accuracy of the output data 1126. For example, some items 1104 may be deemed age restricted such that they are to be handled only by users 1116 above a minimum age threshold.

In instances where human confirmation is desired, sensor data associated with an event 1124 may be processed to generate inquiry data. The inquiry data may include a subset of the sensor data associated with the event 1124. The inquiry data may also include one or more of one or more tentative results as determined by the automated techniques, or supplemental data. The subset of the sensor data may be determined using information about the one or more sensors 1120. For example, camera data such as the location of the camera 1120(1) within the facility 1102, the orientation of the camera 1120(1), and a field of view 1128 of the camera 1120(1) may be used to determine if a particular location within the facility 1102 is within the field of view 1128. The subset of the sensor data may include images that may show the inventory location 1114 or that the item 1104 was stowed. The subset of the sensor data may also omit images from other cameras 1120(1) that did not have that inventory location 1114 in the field of view 1128. The field of view 1128 may comprise a portion of the scene in the facility 1102 that the sensor 1120 is able to generate sensor data about.

Continuing the example, the subset of the sensor data may comprise a video clip acquired by one or more cameras 1120(1) having a field of view 1128 that includes the item 1104. The tentative results may comprise the "best guess" as to which items 1104 may have been involved in the event 1124. For example, the tentative results may comprise results determined by the automated system that have a confidence level above a minimum threshold.

The facility 1102 may be configured to receive different kinds of items 1104 from various suppliers and to store them until a customer orders or retrieves one or more of the items 1104. A general flow of items 1104 through the facility 1102 is indicated by the arrows of FIG. 2. Specifically, as illustrated in this example, items 1104 may be received from one or more suppliers, such as manufacturers, distributors, wholesalers, and so forth, at the receiving area 1106. In various implementations, the items 1104 may include merchandise, commodities, perishables, or any suitable type of item 1104, depending on the nature of the enterprise that operates the facility 1102. The receiving of the items 1104 may comprise one or more events 1124 for which the inventory management system 1122 may generate output data 1126.

Upon being received from a supplier at receiving area 1106, the items 1104 may be prepared for storage. For example, items 1104 may be unpacked or otherwise rearranged. The inventory management system 1122 may include one or more software applications executing on a computer system to provide inventory management functions based on the events 1124 associated with the unpacking or rearrangement. These inventory management functions may include maintaining information indicative of the type, quantity, condition, cost, location, weight, or any other suitable parameters with respect to the items 1104. The items 1104 may be stocked, managed, or dispensed in terms of countable, individual units or multiples, such as packages, cartons, crates, pallets, or other suitable aggregations. Alternatively, some items 1104, such as bulk products, commodities, and so forth, may be stored in continuous or arbitrarily divisible amounts that may not be inherently organized into countable units. Such items 1104 may be managed in terms of measurable quantity such as units of length, area, volume, weight, time, duration, or other dimensional properties characterized by units of measurement. Generally speaking, a quantity of an item 1104 may refer to either a countable number of individual or aggregate units of an item 1104 or a measurable amount of an item 1104, as appropriate.

After arriving through the receiving area 1106, items 1104 may be stored within the storage area 1108. In some implementations, like items 1104 may be stored or displayed together in the inventory locations 1114 such as in bins, on shelves, hanging from pegboards, and so forth. In this implementation, all items 1104 of a given kind are stored in one inventory location 1114. In other implementations, like items 1104 may be stored in different inventory locations 1114. For example, to optimize retrieval of certain items 1104 having frequent turnover within a large physical facility 1102, those items 1104 may be stored in several different inventory locations 1114 to reduce congestion that might occur at a single inventory location 1114. Storage of the items 1104 and their respective inventory locations 1114 may comprise one or more events 1124.

When a customer order specifying one or more items 1104 is received, or as a user 1116 progresses through the facility 1102, the corresponding items 1104 may be selected or "picked" from the inventory locations 1114 containing those items 1104. In various implementations, item picking may range from manual to completely automated picking. For example, in one implementation, a user 1116 may have a list of items 1104 they desire and may progress through the facility 1102 picking items 1104 from inventory locations 1114 within the storage area 1108, and placing those items 1104 into a tote 1118. In other implementations, employees of the facility 1102 may pick items 1104 using written or electronic pick lists derived from customer orders. These picked items 1104 may be placed into the tote 1118 as the employee progresses through the facility 1102. Picking may comprise one or more events 1124, such as the user 1116 in moving to the inventory location 1114, retrieval of the item 1104 from the inventory location 1114, and so forth.

After items 1104 have been picked, they may be processed at a transition area 1110. The transition area 1110 may be any designated area within the facility 1102 where items 1104 are transitioned from one location to another or from one entity to another. For example, the transition area 1110 may be a packing station within the facility 1102. When the item 1104 arrives at the transition area 1110, the items 1104 may be transitioned from the storage area 1108 to the packing station. The transitioning may comprise one or more events 1124. Information about the transition may be maintained by the inventory management system 1122 using the output data 1126 associated with those events 1124.

In another example, if the items 1104 are departing the facility 1102 a list of the items 1104 may be obtained and used by the inventory management system 1122 to transition responsibility for, or custody of, the items 1104 from the facility 1102 to another entity. For example, a carrier may accept the items 1104 for transport with that carrier accepting responsibility for the items 1104 indicated in the list. In another example, a customer may purchase or rent the items 1104 and remove the items 1104 from the facility 1102. The purchase or rental may comprise one or more events 1124.

The inventory management system 1122 may access or generate sensor data about the facility 1102 and the contents therein including the items 1104, the users 1116, the totes 1118, and so forth. The sensor data may be acquired by one or more of the sensors 1120, data provided by other systems, and so forth. For example, the sensors 1120 may include cameras 1120(1) configured to acquire image data of scenes in the facility 1102. The image data may comprise still images, video, or a combination thereof. The image data may be processed by the inventory management system 1122 to determine a location of the user 1116, the tote 1118, the identity of the user 1116, and so forth. As used herein, the identity of the user may represent a unique identifier of the user (e.g., name, number associated with user, username, etc.), an identifier that distinguishes the user amongst other users being located with the environment, or the like.

The inventory management system 1122, or systems coupled thereto, may be configured to identify the user 1116, as well as to determine other candidate users. In one implementation, this determination may comprise comparing sensor data with previously stored identity data. For example, the user 1116 may be identified by showing their face to a facial recognition system, by presenting a token carrying authentication credentials, providing a fingerprint, scanning a barcode or other type of unique identifier upon entering the facility, and so forth. Identity of the user 1116 may be determined before, during, or after entry to the facility 1102. Determination of the user's 1116 identity may comprise comparing sensor data associated with the user 1116 in the facility 1102 to previously stored user data.

In some instances, the inventory management system group users within the facility into respective sessions. That is, the inventory management system 1122 may utilize the sensor data to determine groups of users that are effectively "together" (e.g., shopping together). In some instances, a particular session may include multiple users that entered the facility 1102 together and, potentially, that navigate the facility together. For example, when a family of two adults and two children enter the facility together, the inventory management system may associate each user with a particular session. Locating sessions in addition to individual users may help in determining the outcome of individual events, given that users within a session may not only individually pick or return or otherwise interact with items, but may also pass the items back and forth amongst each other. For instance, a child in the above example may pick the box of cereal before handing the box to her mother, who may place it in her tote 1118. Noting the child and the mother as belonging to the same session may increase the chances of successfully adding the box of cereal to the virtual shopping cart of the mother.

By determining the occurrence of one or more events 1124 and the output data 1126 associated therewith, the inventory management system 1122 is able to provide one or more services to the users 1116 of the facility 1102. By utilizing one or more human associates to process inquiry data and generate response data that may then be used to produce output data 1126, overall accuracy of the system may be enhanced. The enhanced accuracy may improve the user experience of the one or more users 1116 of the facility 1102. In some examples, the output data 1126 may be transmitted over a network 1130 to one or more servers 1132.

FIG. 12 illustrates a block diagram of the one or more servers 1132. The servers 1132 may be physically present at the facility 1102, may be accessible by the network 1130, or a combination of both. The servers 1132 do not require end-user knowledge of the physical location and configuration of the system that delivers the services. Common expressions associated with the servers 1132 may include "on-demand computing," "software as a service (SaaS)," "platform computing," "network-accessible platform," "cloud services," "data centers," and so forth. Services provided by the servers 1132 may be distributed across one or more physical or virtual devices.

The servers 1132 may include one or more hardware processors 1002 (processors) configured to execute one or more stored instructions. The processors 1002 may comprise one or more cores. The servers 1132 may include one or more input/output (I/O) interface(s) 1004 to allow the processor 1002 or other portions of the servers 1132 to communicate with other devices. The I/O interfaces 1204 may comprise Inter-Integrated Circuit (I2C), Serial Peripheral Interface bus (SPI), Universal Serial Bus (USB) as promulgated by the USB Implementers Forum, and so forth.

The servers 1132 may also include one or more communication interfaces 1206. The communication interfaces 1206 are configured to provide communications between the servers 1132 and other devices, such as the sensors 1120, the interface devices, routers, and so forth. The communication interfaces 1206 may include devices configured to couple to personal area networks (PANs), wired and wireless local area networks (LANs), wired and wireless wide area networks (WANs), and so forth. For example, the communication interfaces 1206 may include devices compatible with Ethernet, Wi-Fi™, and so forth. The servers 1132 may also include one or more busses or other internal communications hardware or software that allow for the transfer of data between the various modules and components of the servers 1132.

The servers 1132 may also include a power supply 1240. The power supply 1240 is configured to provide electrical power suitable for operating the components in the servers 1132.

The servers 1132 may further include one or more memories 1210. The memory 1210 comprises one or more computer-readable storage media (CRSM). The CRSM may be any one or more of an electronic storage medium, a magnetic storage medium, an optical storage medium, a quantum storage medium, a mechanical computer storage medium, and so forth. The memory 1210 provides storage of computer-readable instructions, data structures, program modules, and other data for the operation of the servers 1132. A few example functional modules are shown stored in the memory 1210, although the same functionality may alternatively be implemented in hardware, firmware, or as a system on a chip (SOC).

The memory 1210 may include at least one operating system (OS) component 1212. The OS component 1212 is configured to manage hardware resource devices such as the I/O interfaces 1204, the communication interfaces 1208, and provide various services to applications or components executing on the processors 1002. The OS component 1212 may implement a variant of the FreeBSD™ operating system as promulgated by the FreeBSD Project; other UNIX™ or UNIX-like variants; a variation of the Linux™ operating system as promulgated by Linus Torvalds; the Windows® Server operating system from Microsoft Corporation of Redmond, Wash., USA; and so forth.

One or more of the following components may also be stored in the memory 1210. These components may be executed as foreground applications, background tasks, daemons, and so forth. A communication component 1214 may be configured to establish communications with one or more of the sensors 1120, one or more of the devices used by associates, other servers 1132, or other devices. The communications may be authenticated, encrypted, and so forth.

The memory 1210 may store an inventory management system 1216. The inventory management system 1216 is configured to provide the inventory functions as described herein with regard to the inventory management system 1122. For example, the inventory management system 1216 may track movement of items 1104 in the facility 1102, generate user interface data, and so forth.

The inventory management system 1216 may access information stored in one or more data stores 1218 in the memory 1210. The data store 1218 may use a flat file, database, linked list, tree, executable code, script, or other data structure to store the information. In some implementations, the data store 1218 or a portion of the data store 1218 may be distributed across one or more other devices including other servers 1132, network attached storage devices, and so forth.

The data store 1218 may include physical layout data 1220. The physical layout data 1220 provides a mapping of physical locations within the physical layout of devices and objects such as the sensors 1120, inventory locations 1114, and so forth. The physical layout data 1220 may indicate the coordinates within the facility 1102 of an inventory location 1114, sensors 1120 within view of that inventory location 1114, and so forth. For example, the physical layout data 1220 may include camera data comprising one or more of a location within the facility 1102 of a camera 1120(1), orientation of the camera 1120(1), the operational status, and so forth. Continuing example, the physical layout data 1220 may indicate the coordinates of the camera 1120(1), pan and tilt information indicative of a direction that the field of view 1128 is oriented along, whether the camera 1120(1) is operating or malfunctioning, and so forth.

In some implementations, the inventory management system 1216 may access the physical layout data 1220 to determine if a location associated with the event 1124 is within the field of view 1128 of one or more sensors 1120. Continuing the example above, given the location within the facility 1102 of the event 1124 and the camera data, the inventory management system 1216 may determine the cameras 1120(1) that may have generated images of the event 1124.

The item data 1222 comprises information associated with the items 1104. The information may include information indicative of one or more inventory locations 1114 at which one or more of the items 1104 are stored. The item data 1222 may also include order data, SKU or other product identifier, price, quantity on hand, weight, expiration date, images of the ITEM 1104, detail description information, ratings, ranking, and so forth. The inventory management system 1216 may store information associated with inventory management functions in the item data 1222.

The data store 1218 may also include sensor data 1224. The sensor data 1224 comprises information acquired from, or based on, the one or more sensors 1120. For example, the sensor data 1224 may comprise 3D information about an object in the facility 1102. As described above, the sensors 1120 may include a camera 1120(1), which is configured to acquire one or more images. These images may be stored as the image data 1226. The image data 1226 may comprise information descriptive of a plurality of picture elements or pixels. Non-image data 1228 may comprise information from other sensors 1120, such as input from the microphones 920, weight sensors 1120, and so forth.

User data 1230 may also be stored in the data store 1218. The user data 1230 may include identity data, information indicative of a profile, purchase history, location data, images of the user 1116, demographic data, and so forth. Individual users 1116 or groups of users 1116 may selectively provide user data 1230 for use by the inventory management system 1122. The individual users 1116 or groups of users 1116 may also authorize collection of the user data 1230 during use of the facility 1102 or access to user data 1230 obtained from other systems. For example, the user 1116 may opt-in to collection of the user data 1230 to receive enhanced services while using the facility 1102.

In some implementations, the user data 1230 may include information designating a user 1116 for special handling. For example, the user data 1230 may indicate that a particular user 1116 has been associated with an increased number of errors with respect to output data 1126. The inventory management system 1216 may be configured to use this information to apply additional scrutiny to the events 1124 associated with this user 1116. For example, events 1124 that include an item 1104 having a cost or result above the threshold amount may be provided to the associates for processing regardless of the determined level of confidence in the output data 1126 as generated by the automated system.

The inventory management system 1216 may include one or more of a location component 1232, identification component 1234, event-determination component 1236, and inquiry component 1238.

The location component 1232 functions to locate items or users within the environment of the facility to allow the inventory management system 1216 to assign certain events to the correct users. That is, the location component 1232 may assign unique identifiers to users as they enter the facility and, with the users' consent, may locate the users throughout the facility 1102 over the time they remain in the facility 1102. The location component 1232 may perform this locating using sensor data 1224, such as the image data 1226. For example, the location component 1232 may receive the image data 1226 and may use facial-recognition techniques to identify users from the images. After identifying a particular user within the facility, the location component 1232 may then locate the user within the images as the user moves throughout the facility 1102. Further, should the location component 1232 temporarily "lose" a particular user, the location component 1232 may again attempt to identify the users within the facility based on facial recognition, and/or using other techniques such as voice recognition, or the like.

Therefore, upon receiving the indication of the time and location of the event in question, the location component 1232 may query the data store 1218 to determine which one or more users were at or within a threshold distance of the location of the event at the particular time of the event. Further, the location component 1232 may assign different confidence levels to different users, with the confidence levels indicating how likely it is that each corresponding user is the user that is in fact associated with the event of interest.

The location component 1232 may access the sensor data 1224 in order to determine this location data of the user and/or items. The location data provides information indicative of a location of an object, such as the item 1104, the user 1116, the tote 1118, and so forth. The location may be absolute with respect to the facility 1102 or relative to another object or point of reference. Absolute terms may comprise a latitude, longitude, and altitude with respect to a geodetic reference point. Relative terms may include a location of 25.4 meters (m) along an x-axis and 75.2 m along a y-axis as designated by a floor plan of the facility 1102, 5.2 m from an inventory location 1114 along a heading of 169°, and so forth. For example, the location data may indicate that the user 1116(1) is 25.2 m along the aisle 1112(1) and standing in front of the inventory location 1114. In comparison, a relative location may indicate that the user 1116(1) is 32 cm from the tote 1118 at a heading of 73° with respect to the tote 118. The location data may include orientation information, such as which direction the user 1116 is facing. The orientation may be determined by the relative direction the user's 916 body is facing. In some implementations, the orientation may be relative to the interface device. Continuing the example, the location data may indicate that the user 1116(1) is oriented with a heading of 0°, or looking north. In another example, the location data may indicate that the user 1116 is facing towards the interface device.

The identification component 1234 is configured to identify an object. In one implementation, the identification component 1234 may be configured to identify an item 1104. In another implementation, the identification component 1234 may be configured to identify the user 1116. For example, the identification component 1234 may use facial recognition techniques to process the image data 1226 and determine the identity data of the user 1116 depicted in the images by comparing the characteristics in the image data 1226 with previously stored results. The identification component 1234 may also access data from other sensors 1120, such as from an RFID reader 920, an RF receiver 920, fingerprint sensors, and so forth.

The event-determination component 1236 is configured to process the sensor data 1224 and generate output data 1226. The event-determination component 1236 may access information stored in the data store 1218 including, but not limited to, event description data 1242, confidence levels 1244, or threshold values 996. In some instances, the event-determination component 1236 may be configured to perform some or all of the techniques described above with regards to the event-determination component 106. For instance, the event-determination component 1236 may be configured to create and utilize activity classifiers for identifying predefined activity within image data, potentially without use of other sensor data acquired by other sensors in the environment.

The event description data 1242 comprises information indicative of one or more events 1124. For example, the event description data 1242 may comprise predefined profiles that designate movement of an item 1104 from an inventory location 1114 with the event 1124 of "pick". The event description data 1242 may be manually generated or automatically generated. The event description data 1242 may include data indicative of triggers associated with events occurring in the facility 1102. An event may be determined as occurring upon detection of the trigger. For example, sensor data 1224 such as a change in weight from a weight sensor 1120(6) at an inventory location 1114 may trigger detection of an event of an item 1104 being added or removed from the inventory location 1114. In another example, the trigger may comprise an image of the user 1116 reaching a hand toward the inventory location 1114. In yet another example, the trigger may comprise two or more users 1116 approaching to within a threshold distance of one another.

The event-determination component 1236 may process the sensor data 1224 using one or more techniques including, but not limited to, artificial neural networks, classifiers, decision trees, support vector machines, Bayesian networks, and so forth. For example, the event-determination component 1236 may use a decision tree to determine occurrence of the "pick" event 1124 based on sensor data 1224. The event-determination component 1236 may further use the sensor data 1224 to determine one or more tentative results 1248. The one or more tentative results 1248 comprise data associated with the event 1124. For example, where the event 1124 comprises a disambiguation of users 1116, the tentative results 1248 may comprise a list of possible user 1116 identities. In another example, where the event 1124 comprises a disambiguation between items 104, the tentative results 1248 may comprise a list of possible item identifiers. In some implementations, the tentative result 1248 may indicate the possible action. For example, the action may comprise the user 1116 picking, placing, moving an item 1104, damaging an item 1104, providing gestural input, and so forth.

In some implementations, the tentative results 1248 may be generated by other components. For example, the tentative results 1248 such as one or more possible identities or locations of the user 1116 involved in the event 1124 may be generated by the location component 1232. In another example, the tentative results 1248 such as possible items 1104 that may have been involved in the event 1124 may be generated by the identification component 1234.

The event-determination component 1236 may be configured to provide a confidence level 1244 associated with the determination of the tentative results 1248. The confidence level 1244 provides indicia as to the expected level of accuracy of the tentative result 1248. For example, a low confidence level 1244 may indicate that the tentative result 1248 has a low probability of corresponding to the actual circumstances of the event 1124. In comparison, a high confidence level 1244 may indicate that the tentative result 1248 has a high probability of corresponding to the actual circumstances of the event 1124.

In some implementations, the tentative results 1248 having confidence levels 1244 that exceed the threshold may be deemed to be sufficiently accurate and thus may be used as the output data 1126. For example, the event-determination component 1236 may provide tentative results 1248 indicative of the three possible items 1104(1), 904(2), and 904(3) corresponding to the "pick" event 1124. The confidence levels 1244 associated with the possible items 1104(1), 904(2), and 904(3) may be 25%, 70%, 92%, respectively. Continuing the example, the threshold result 396 may be set such that confidence level 1244 of 90% are deemed to be sufficiently accurate. As a result, the event-determination component 1236 may designate the "pick" event 1124 as involving item 1104(3).

The inquiry component 1238 may be configured to use at least a portion of the sensor data 1224 associated with the event 1124 to generate inquiry data 1250. In some implementations, the inquiry data 1250 may include one or more of the tentative results 1248 or supplemental data 1252. The inquiry component 1238 may be configured to provide inquiry data 1250 to one or more devices associated with one or more human associates.

An associate user interface is presented on the respective devices of associates. The associate may generate response data 1254 by selecting a particular tentative result 1248, entering new information, indicating that they are unable to answer the inquiry, and so forth.

The supplemental data 1252 comprises information associated with the event 1124 or that may be useful in interpreting the sensor data 1224. For example, the supplemental data 1252 may comprise previously stored images of the items 1104. In another example, the supplemental data 1252 may comprise one or more graphical overlays. For example, the graphical overlays may comprise graphical user interface elements such as overlays depicting indicia of an object of interest. These indicia may comprise highlights, bounding boxes, arrows, and so forth, that have been superimposed or placed atop the image data 1126 during presentation to an associate.

The inquiry component 1238 processes the response data 1254 provided by the one or more associates. The processing may include calculating one or more statistical results associated with the response data 1254. For example, statistical results may include a count of the number of times associates selected a particular tentative result 1248, determination of a percentage of the associates that selected a particular tentative result 1248, and so forth.

The inquiry component 1238 is configured to generate the output data 1126 based at least in part on the response data 1254. For example, given that a majority of the associates returned response data 1254 indicating that the item 1104 associated with the "pick" event 1124 is item 1104(5), the output data 1126 may indicate that the item 1104(5) was picked.

The inquiry component 1238 may be configured to selectively distribute inquiries to particular associates. For example, some associates may be better suited to answering particular types of inquiries. Performance data, such as statistical data about the performance of the associates, may be determined by the inquiry component 1238 from the response data 1254 provided by the associates. For example, information indicative of a percentage of different inquiries in which the particular associate selected response data 1254 that disagreed with the majority of associates may be maintained. In some implementations, test or practice inquiry data 1250 having a previously known correct answer may be provided to the associate for training or quality assurance purposes. The determination of the set of associates to use may be based at least in part on the performance data.

By using the inquiry component 1238, the event-determination component 1236 may be able to provide high reliability output data 1126 that accurately represents the event 1124. The output data 1126 generated by the inquiry component 1238 from the response data 1254 may also be used to further train the automated systems used by the inventory management system 1216. For example, the sensor data 1224 and the output data 1126, based on response data 1254, may be provided to one or more of the components of the inventory management system 1216 for training in process improvement. Continuing the example, this information may be provided to an artificial neural network, Bayesian network, and so forth, to further train these systems such that the confidence level 1244 and the tentative results 1248 produced in the future for the same or similar input is improved.

Embodiments may be provided as a software program or computer program product including a non-transitory computer-readable storage medium having stored thereon instructions (in compressed or uncompressed form) that may be used to program a computer (or other electronic device) to perform processes or methods described herein. The computer-readable storage medium may be one or more of an electronic storage medium, a magnetic storage medium, an optical storage medium, a quantum storage medium, and so forth. For example, the computer-readable storage media may include, but is not limited to, hard drives, floppy diskettes, optical disks, read-only memories (ROMs), random access memories (RAMs), erasable programmable ROMs (EPROMs), electrically erasable programmable ROMs (EEPROMs), flash memory, magnetic or optical cards, solid-state memory devices, or other types of physical media suitable for storing electronic instructions. Further, embodiments may also be provided as a computer program product including a transitory machine-readable signal (in compressed or uncompressed form). Examples of machine-readable signals, whether modulated using a carrier or unmodulated, include, but are not limited to, signals that a computer system or machine hosting or running a computer program can be configured to access, including signals transferred by one or more networks. For example, the transitory machine-readable signal may comprise transmission of software by the Internet.

Separate instances of these programs can be executed on or distributed across any number of separate computer systems. Thus, although certain steps have been described as being performed by certain devices, software programs, processes, or entities, this need not be the case, and a variety of alternative implementations will be understood by those having ordinary skill in the art.

Additionally, those having ordinary skill in the art readily recognize that the techniques described above can be utilized in a variety of devices, environments, and situations. Although the subject matter has been described in language specific to structural features or methodological acts, it is to be understood that the subject matter defined in the appended claims is not necessarily limited to the specific features or acts described. Rather, the specific features and acts are disclosed as exemplary forms of implementing the claims.

While the foregoing invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. A method comprising:
    receiving data indicating labels that have been applied to video data, wherein pixels of the video data are each associated with a respective label indicating a type of item corresponding to a respective pixel;
    generating feature data based at least in part on the respective labels associated with the pixels of the video data;
    inputting the feature data into an activity classifier;
    receiving, from the activity classifier, a score map for a frame of the video data, the score map at least indicating that a first group of pixels within the frame represents a predefined activity and a second group of pixels within the frame does not represent the predefined activity; and
    receiving, based at least in part on the score map, an indication that the video data represents the predefined activity, a start time of the predefined activity, and an end time of the predefined activity.

2. The method as recited in claim 1, wherein generating the feature data further comprises:
    defining the first group of pixels within the frame of the video data; and
    determining, within the first group of pixels, a frequency of each of the labels;
    and wherein the inputting the feature data comprises inputting information representing the frequency of the labels within the first group of pixels.

3. The method as recited in claim 1, wherein generating the feature data further comprises:
    defining the first group of pixels within the frame of the video data;
    determining a frequency of each of the labels within the first group of pixels; and
    determining a frequency of the labels within one or more pixels that neighbor the first group of pixels within the frame;
    and wherein the inputting the feature data comprises inputting information representing the frequency of the labels within the first group of pixels and the frequency of the labels within the one or more pixels that neighbor the first group of pixels in the frame.

4. The method as recited in claim 1, wherein the frame comprises a first frame and generating the feature data further comprises:
defining the first group of pixels within the first frame of the video data;
determining a frequency of each of the labels within the first group of pixels;
determining a third group of pixels within a second frame of the video data, the third group of pixels corresponding in position to the first group of pixels; and
determining a frequency of the labels within the third group of pixels;
and wherein the inputting the feature data comprises inputting information representing the frequency of the labels within the first group of pixels and the frequency of the labels within the third group of pixels.

5. The method as recited in claim 1, wherein the frame comprises a first frame, and further comprising:
defining the first group of pixels within the first frame of the video data;
determining a frequency of each of the labels within the first group of pixels;
determining a third group of pixels within a second frame of the video data, the third group of pixels corresponding in position to the first group of pixels, wherein the second frame is prior to the first frame;
determining a frequency of the labels within the third group of pixels;
determining a fourth group of pixels within a third frame of the video data, the fourth group of pixels also corresponding in position to the first group of pixels, wherein the third frame is after the first frame;
determining a frequency of the labels within the fourth group of pixels;
and wherein the inputting the feature data comprises inputting information representing the frequency of the labels within the first group of pixels, the frequency of the labels within the third group of pixels, and the frequency of the labels within the fourth group of pixels.

6. The method as recited in claim 1, wherein the labels comprise at least one of a body part of a user in a facility, an item held by the user, a background of the facility, a shelf in the facility, or a floor in the facility.

7. The method as recited in claim 1, wherein the predefined activity comprises at least one of a user picking an item from a shelf, a user returning an item to the shelf, or a first user passing an item to a second user.

8. The method as recited in claim 1, further comprising:
analyzing the indication of the predefined activity, the start time, the end time, and sensor data acquired by one or more sensors within a facility to determine occurrence of an event, the event comprising at least one of a user acquiring an item from the facility or returning an item to the facility; and
updating virtual-cart data associated with the user to indicate the occurrence of the event.

9. A system comprising:
one or more processors; and
one or more computer-readable media storing computer-executable instructions that, when executed, cause the one or more processors to perform acts comprising:
receiving data indicating labels that have been applied to video data, wherein pixels of the video data are each associated with a respective label indicating a type of item corresponding to a respective pixel;
generating feature data based at least in part on the respective labels associated with the pixels of the video data;
inputting the feature data into an activity classifier;
receiving, from the activity classifier, a score map for a frame of the video data, the score map indicating, for pixel groups within the frame, whether each respective pixel group: (1) represents a predefined activity, or (2) does not represent the predefined activity; and
receiving, based at least in part on the score map, an indication that the video data represents the predefined activity, a start time of the predefined activity, and an end time of the predefined activity.

10. The system as recited in claim 9, wherein generating the feature data further comprises:
defining a first pixel group within the frame of the video data; and
determining, within the first pixel group, a frequency of each of the labels;
and wherein the inputting the feature data comprises inputting information representing the frequency of the labels within the first pixel group.

11. The system as recited in claim 9, wherein generating the feature data further comprises:
defining a first pixel group within the frame of the video data;
determining a frequency of each of the labels within the first pixel group; and
determining a frequency of the labels within one or more pixels that neighbor the first pixel group;
and wherein the inputting the feature data comprises inputting information representing the frequency of the labels within the first pixel group and the frequency of the labels within the one or more pixels that neighbor the first pixel group.

12. The system as recited in claim 9, wherein the frame comprises a first frame and generating the feature data further comprises:
defining a first pixel group within the first frame of the video data;
determining a frequency of each of the labels within the first pixel group;
determining a second pixel group within a second frame of the video data, the second pixel group corresponding in position to the first pixel group; and
determining a frequency of the labels within the second pixel group;
and wherein the inputting the feature data comprises inputting information representing the frequency of the labels within the first pixel group and the frequency of the labels within the second pixel group.

13. The system as recited in claim 9, wherein the frame comprises a first frame and the computer-executable instructions further cause the one or more processors to perform acts comprising:
defining a first pixel group within the first frame of the video data;
determining a frequency of each of the labels within the first pixel group;
determining a second pixel group within a second frame of the video data, the second pixel group corresponding in position to the first pixel group, wherein the second frame is prior to the first frame;
determining a frequency of the labels within the second pixel group;

determining a third pixel group within a third frame of the video data, the third pixel group also corresponding in position to the first pixel group, wherein the third frame is after the first frame;

determining a frequency of the labels within the third pixel group;

and wherein the inputting the feature data comprises inputting information representing the frequency of the labels within the first, the frequency of the labels within the second pixel group, and the frequency of the labels within the third pixel group.

14. The system as recited in claim 9, wherein:

the labels comprise at least one of a body part of a user in a facility, an item held by the user, a background of the facility, a shelf in the facility, or a floor in the facility; and the predefined activity comprises at least one of a user picking an item from a shelf, a user returning an item to the shelf, or a first user passing an item to a second user.

15. The system as recited in claim 9, wherein the computer-executable instructions further cause the one or more processors to perform acts comprising:

analyzing the indication of the predefined activity, the start time, the end time, and sensor data acquired by one or more sensors within a facility to determine occurrence of an event, the event comprising at least one of a user acquiring an item from the facility or returning an item to the facility; and updating virtual-cart data associated with the user to indicate the occurrence of the event.

16. One or more computer-readable media storing computer-executable instruction that, when executed, cause one or more processors to perform acts comprising:

receiving data indicating labels that have been applied to video data, wherein pixels of the video data are each associated with a respective label indicating a type of item corresponding to a respective pixel;

generating feature data based at least in part on the respective labels associated with the pixels of the video data;

inputting the feature data into an activity classifier;

receiving, from the activity classifier, a score map for a frame of the video data, the score map indicating, for pixel groups within the frame, whether each respective pixel group: (1) represents a predefined activity, or (2) does not represent the predefined activity; and receiving, based at least in part on the score map, an indication that the video data represents a predefined activity, a start time of the predefined activity, and an end time of the predefined activity.

17. The one or more computer-readable media as recited in claim 16, wherein generating the feature data further comprises:

defining a first pixel group within the frame of the video data; and determining, within the first pixel group, a frequency of each of the labels;

and wherein the inputting the feature data comprises inputting information representing the frequency of the labels within the first pixel group.

18. The one or more computer-readable media as recited in claim 16, wherein generating the feature data further comprises:

defining a first pixel group within the frame of the video data;

determining a frequency of each of the labels within the first pixel group; and determining a frequency of the labels within one or more pixels that neighbor the first pixel group;

and wherein the inputting the feature data comprises inputting information representing the frequency of the labels within the first pixel group and the frequency of the labels within the one or more pixels that neighbor the first pixel group.

19. A method comprising:

receiving first data indicating that a first pixel of video data is associated with a first label;

generating feature data based at least in part on the first data;

inputting the feature data into an activity classifier;

receiving, from the activity classifier, second data indicating that a first group of pixels within a frame of the video data represents a predefined activity and that a second group of pixels within the frame of the video data does not represent the predefined activity; and receiving, based at least in part on the second data, an indication that the video data represents the predefined activity and at least one of a start time of the predefined activity or an end time of the predefined activity.

20. A system comprising:

one or more processors; and one or more computer-readable media storing computer-executable instruction that, when executed, cause the one or more processors to perform acts comprising:

receiving first data indicating that a first pixel of video data is associated with a first label;

generating feature data based at least in part on the first data;

inputting the feature data into an activity classifier;

receiving, from the activity classifier, second data indicating that a first group of pixels within a frame of the video data represents an activity and that a second group of pixels within the frame of the video data does not represent the activity; and receiving, based at least in part on the second data, an indication that the video data represents the activity.

* * * * *